United States Patent
Thiel et al.

(10) Patent No.: US 11,618,814 B2
(45) Date of Patent: Apr. 4, 2023

(54) ELASTOMERIC COMPOSITIONS CONTAINING A SOLID RESIDUE OF ISOCYANATE MANUFACTURING

(71) Applicant: Covestro LLC, Pittsburgh, PA (US)

(72) Inventors: Timothy W. Thiel, Moon Township, PA (US); Don S. Wardius, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 249 days.

(21) Appl. No.: 17/112,186

(22) Filed: Dec. 4, 2020

(65) Prior Publication Data

US 2022/0177683 A1    Jun. 9, 2022

(51) Int. Cl.
*C08L 23/16* (2006.01)
*C08L 75/04* (2006.01)
*C08K 7/00* (2006.01)
*C08K 5/29* (2006.01)
*C08K 3/04* (2006.01)

(52) U.S. Cl.
CPC .............. *C08L 23/16* (2013.01); *C08K 7/00* (2013.01); *C08L 75/04* (2013.01); *C08K 3/04* (2013.01); *C08K 5/29* (2013.01); *C08L 2207/04* (2013.01)

(58) Field of Classification Search
CPC ........... C08L 23/16; C08L 75/04; C08K 3/04; C08K 5/29
See application file for complete search history.

(56) References Cited

U.S. PATENT DOCUMENTS

| | | |
|---|---|---|
| 3,937,782 A | 2/1976 | Blount |
| 3,956,466 A | 5/1976 | Blount |
| 3,983,081 A | 9/1976 | Dieterich et al. |
| 3,993,737 A | 11/1976 | Blount |
| 4,072,637 A | 2/1978 | Blount |
| 4,096,101 A | 6/1978 | Blahak et al. |
| 4,097,423 A | 6/1978 | Dieterich |
| 4,143,008 A | 3/1979 | Zwolinski et al. |
| 4,159,369 A | 6/1979 | Blount |
| 4,211,848 A | 7/1980 | Blount |
| 4,251,401 A | 2/1981 | Reischl |
| 4,251,638 A | 2/1981 | Reischl |
| 4,262,108 A | 4/1981 | Blount |
| 4,280,006 A | 7/1981 | Blount |
| 4,282,129 A | 8/1981 | Blount |
| 4,293,456 A | 10/1981 | Reischl |
| 4,296,211 A | 10/1981 | Blount |
| 4,303,768 A | 12/1981 | Blount |
| 4,311,800 A | 1/1982 | Reischl |
| 4,316,745 A | 2/1982 | Blount |
| 4,320,208 A | 3/1982 | Reischl et al. |
| 4,321,184 A | 3/1982 | Blount |
| 4,325,859 A | 4/1982 | Blount |
| 4,332,712 A | 6/1982 | Blount |
| 4,332,926 A | 6/1982 | Blount |
| 4,346,185 A | 8/1982 | Blount |
| 4,350,775 A | 9/1982 | Blount |
| 4,357,460 A | 11/1982 | Blount |
| 4,357,463 A | 11/1982 | Blount |
| 4,377,659 A | 3/1983 | Blount |
| 4,378,441 A | 3/1983 | Blount |
| 4,569,982 A * | 2/1986 | Grogler ............... C08G 18/707 528/68 |
| 4,595,709 A | 6/1986 | Reischl |
| 5,446,196 A | 8/1995 | Benedix et al. |
| 5,654,390 A | 8/1997 | Gajewski et al. |
| 5,753,750 A | 5/1998 | Slack et al. |
| 5,756,636 A | 5/1998 | Slack et al. |
| 5,804,648 A | 9/1998 | Slack |
| 5,821,316 A | 10/1998 | Quay et al. |
| 5,837,794 A | 11/1998 | Slack et al. |
| 6,660,943 B1 | 12/2003 | Gotoh et al. |
| 6,881,591 B2 | 4/2005 | Gotoh et al. |
| 7,488,236 B2 | 2/2009 | Shimomura et al. |
| 7,651,761 B2 | 1/2010 | Kazuno et al. |
| 8,318,825 B2 | 11/2012 | Shimomura et al. |

(Continued)

FOREIGN PATENT DOCUMENTS

| CN | 100400517 C | 7/2008 |
|---|---|---|
| CN | 100400520 C | 7/2008 |

(Continued)

OTHER PUBLICATIONS

Ciullo, Peter A. et al.; The Rubber Formulary, Noyes Publications, pp. 1-74 (1999).

(Continued)

*Primary Examiner* — Mark S Kaucher
(74) *Attorney, Agent, or Firm* — Donald R. Palladino

(57) ABSTRACT

Disclosed are elastomer compositions. The elastomer compositions include at least 20% by weight, based on the total weight of the elastomer composition, of a polymer matrix; and (b) 0.1 to 70% by weight, based on the total weight of the elastomer composition, of a solid isocyanate residue of isocyanate manufacturing, the solid having, prior to its inclusion in the elastomer composition, a $D_{90,3}$ particle size of no more than 70 microns. Elastomer products made using these elastomer compositions can include, for example, a tire treadstock, a tire sidewall stock, a roofing membrane, a door seal, a window seal, a trunk seal, a hood seal, a hose, such as a hose in a vehicular cooling system circuit, or a hanger element attaching an exhaust system to a vehicle underfloor.

18 Claims, No Drawings

(56) References Cited

U.S. PATENT DOCUMENTS

| | | |
|---|---|---|
| 10,370,481 B2 | 8/2019 | Sanz et al. |
| 10,400,112 B2 | 9/2019 | Pavlovich et al. |
| 10,465,090 B2 | 11/2019 | Poole et al. |
| 10,851,239 B2 | 12/2020 | Adkins et al. |
| 2008/0278613 A1 | 11/2008 | Kazuno et al. |
| 2020/0140684 A1* | 5/2020 | Adkins .............. C08G 18/7621 |

FOREIGN PATENT DOCUMENTS

| | | |
|---|---|---|
| CN | 101497770 B | 12/2010 |
| CN | 101774949 B | 10/2012 |
| CN | 101870666 B | 4/2013 |
| CN | 104311454 A | 1/2015 |
| CN | 107446112 A | 12/2017 |
| WO | WO 8200034 A1 | 1/1982 |
| WO | WO 8202388 A1 | 7/1982 |
| WO | WO 2018176300 A1 | 10/2018 |

OTHER PUBLICATIONS

Stewart, Mark; Understanding and Selecting Performance Additives for Rubber Compounding; Hexpol Performance Additives, (Mar. 5, 2020).

* cited by examiner

ELASTOMERIC COMPOSITIONS CONTAINING A SOLID RESIDUE OF ISOCYANATE MANUFACTURING

FIELD

The present specification relates generally to elastomers, such as rubbers, compositions that include a solid residue of an isocyanate manufacturing process, as well as to the use of such compositions.

BACKGROUND

Elastomers, sometimes referred to as elastic polymers, are polymers that exhibit an elastic response over a large range of strain when a mechanical force is applied. When the force is released, the elastomer returns to its original shape. Rubber is a term frequently used to describe elastomers that must be vulcanized or cured to be useful.

Elastomer compositions, such as diene rubber-containing compositions, are used in many applications. In some such applications, such as goods used in the aviation, transportation, and automotive sectors, light-weighting while maintaining performance properties is a key development priority. One such diene rubber, ethylene propylene diene monomer rubber (referred to herein as "EPDM rubber" is often used, for example, as a roofing membrane, which is an important weather-proof and water-proof element in the construction of flat roofs for commercial buildings, and in various automotive applications, where EPDM rubber is often used as a door seal, window seal, trunk seal, or hood seal. In addition, EPDM rubber is often used to construct hoses in a vehicular cooling system circuit and to construct hanger elements that attach exhaust systems to the vehicle underfloor. In vehicular applications in particular, weight is an important consideration, as any reduction in weight can improve fuel efficiency, for example.

In many cases, carbon black is used as reinforcing filler in elastomer compositions. Carbon black, however, can be expensive and has a large environmental footprint manifesting as various health, safety and environment impacts. Moreover, carbon black has a relatively high specific gravity, typically around 1.8, which can add a significant amount of undesirable weight to the elastomer good. Other materials, such as calcined clay, hard and soft clays, silica, mica, talc, diatomaceous earth, wollastonite and calcium carbonate, may also be used to fill and extend elastomer compositions, but they can be expensive in their finely divided form or cause physical property deficits to occur. Moreover, their specific gravities are even higher, typically ranging from 1.9 to 2.9. In certain applications, barium sulfate, titanium dioxide, zinc oxide, and magnetite/hematite are used as fillers or extenders and their specific gravities are yet even higher, typically ranging from 4.0 to 5.6.

Toluene diisocyanate ("TDI") is an important product for the manufacture of polyurethanes. It is manufactured by phosgenation of diamines followed by distillation to recover solvents and the diisocyanate(s). This distillation process results in a high molecular weight residue of the TDI (often referred to as "TDI residue") that is typically discarded as waste. Since TDI is manufactured in large quantities, such disposal can be expensive and otherwise undesirable. Nevertheless, TDI residue is reproducible and consistent when samples are taken from the process and subjected to analysis to characterize its composition.

As a result, it would be desirable to take advantage of this reproducibility and consistency and identify valuable uses of TDI residue. In particular, since certain types of TDI residue are the product of a highly controlled, highly repeatable and reproducible process; are based on highly consistent raw materials; and are themselves very consistent over time in their composition and physical and chemical characteristics, it would be desirable to identify applications that would benefit from use of such a material as a raw material to produce another product. The inventions described herein were made in view of the foregoing.

SUMMARY

In some respects, the present specification is directed to elastomer compositions. These elastomer compositions comprise: (a) at least 20% by weight, based on the total weight of the rubber composition, of a polymer matrix; and (b) 0.1 to 70% by weight, based on the total weight of the elastomer composition, of a solid isocyanate residue having, prior to its inclusion in the elastomer composition, a $D_{90,3}$ particle size of no more than 70 microns.

In other respects, the present specification is directed to elastomer compositions that comprise: (a) at least 20% by weight, based on the total weight of the elastomer composition, of a polymer matrix; and (b) 0.1 to 70% by weight, based on the total weight of the elastomer composition, of organic particulates having, prior to its inclusion in the elastomer composition, a $D_{90}$ particle size of no more than 70 microns, the organic particulates comprising: (i) a cross-linked polymer comprising aromatic groups, biuret groups, urea groups, and carbodiimide groups; and (ii) a high-boiling hydrocarbon.

The present specification is also directed to, among other things, use of the foregoing elastomer compositions as a roofing membrane and as a seal and/or hose in a vehicle.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The inventions described in this specification relate to the discovery that certain relatively low density solid residues from isocyanate manufacturing can be successfully employed to at least partially replace higher density reinforcing fillers often used in elastomer compositions, such as carbon black, clay, talc, silica and calcium carbonate. Since these "isocyanate residues" are already produced as a byproduct in the manufacturing of isocyanates, which are important in the manufacture of polyurethanes, the use of such residues in elastomer compositions avoids their disposal as waste and, as such, is an environmentally friendly solution that promotes circular economy goals.

Thus, as indicated, embodiments of this specification are directed to elastomer compositions. As will be appreciated, elastomers are non-crystalline, amorphous polymers which typically have been vulcanized to introduce cross-links between the high polymer chains. Elastomer compositions are characterized by, when temperatures are above the glass transition temperature of the polymer, the introduction of a mechanical strain of up to 1000% results in elastic behavior, stress proportional to strain, and virtually instantaneous recovery to original shape when the strain is relieved. Natural rubber and others that crystallize upon strain are a special case as their elastic constant may differ before and after the formation of crystalline domains. DIN 53501 defines the relevant terms such as raw rubber, vulcanization and elastomer by explaining the characteristics of the resulting products. Elastomers are crosslinked organic, typically synthetic, polymers which are hard and glass like at low temperatures, and do not manifest viscous flow at warm temperatures. In the vicinity of room temperature they have a rubbery elastic response to mechanical stress. Typically this means that the shear modulus values are relatively low and relatively independent of variations of temperature within the rubbery zone. If these materials are subjected to sustained high heat they are prone to chemically decompose once the temperature becomes high enough.

Elastomers are only one category within the larger group of polymers, and elastomers is a separate class from thermoplastics and thermosets. DIN 7724 provides a classification of organic polymers into these following broad categories by key characteristics of each: Thermoplastics—uncrosslinked, energy elastic character, flow when subjected to stress at high enough temperature (above their melting point); Thermosets—highly crosslinked, energy elastic character, do not melt or flow when subjected to high temperatures, rather as high heat continues they decompose; Elastomers—crosslinked, rubber elastic character, do not flow when heated, if high heat continues they decompose; Thermoplastic elastomers—crosslinked, rubber elastic character, capable of flow when subjected to heat typically because the crosslinks uncouple affording enhanced mobility to polymer chains.

Elastomers typically display a "glass transition temperature" which provides delineation between a relatively high shear modulus energy elastic (glassy) state, and, as the temperature rises and the glass transition temperature is crossed, a sudden decrease in the shear modulus to a more modest value which remains largely invariant regardless of temperature in the rubbery elastic state.

The elastomer compositions of this specification include a polymer matrix. Examples of suitable polymer matrices include natural rubbers and synthetic rubbers, as well as blends thereof. Within the class of synthetic rubbers are general purpose rubbers and special purpose rubbers. As used herein, "matrix" refers to a material which binds another material together.

Suitable natural rubbers (NR) are rubbers obtained from the latex milk of particular plants encountered in the tropical climate zone. Exemplary natural rubbers that can be used in the compositions of this specification include standard malaysian rubber (SMR), standard vietnamese rubber (SVR), standard indonesian rubber (SIR), ribbed smoked sheet (RSS) Nos. 1 to 6, and pale crepe Nos. 1 to 3, among others.

Suitable synthetic rubbers are the general purpose rubbers, such as styrene-butadiene and ethylene propylene diene rubbers, amongst others.

In some implementations, the general purpose rubber comprises a synthetic diene-containing rubber. Examples of such rubbers include, without limitation, polyisoprene rubbers, styrene-isoprene rubbers, chloroprene rubbers (Neoprene), styrene-butadiene rubbers (SBR), styrene-isoprene-butadiene rubbers, butadiene-isoprene rubbers, polybutadiene rubbers, butyl and halobutyl rubbers, ethylene-propylene rubbers, such as ethylene-propylene diene rubbers (EPDM), polynorbornene rubbers, and acrylonitrile-butadiene rubbers (NBR), including combinations of any two or more thereof.

Suitable synthetic rubbers are also the special purpose rubbers, such as, silicone rubbers, fluorocarbon elastomers, fluorosilicone elastomers, polysulfide elastomers, millable polyurethanes and polycarbonate-polyurethanes, poly(n-alkyl)acrylates, ethylene acrylic rubbers, ethylene acrylic rubbers, ethylene vinyl acetate rubbers, epichlorohydrin rubbers, crosslinked polyethylene rubbers, chlorinated polyethylene rubbers, chlorosulfonated polyethylene rubbers, hydrogenated nitrile rubbers, polyphosphazene elastomers, and tetrafluoroethylene-propylene elastomers, including combinations of any two or more thereof.

Suitable synthetic rubbers also include certain thermoplastics with rubbery characteristics, such as styrenic block copolymers, thermoplastic polyolefins, thermoplastic vulcanizates, thermoplastic polyurethanes, thermoplastic copolyester, and thermoplastic polyamides, TPA (TPE-A); ethylene-propylene rubbers, silicone rubbers, fluoroelastomers, polysulfides, polycarbonates, polycarbonate-urethanes, polyacrylates, ethylene acrylic rubbers, ethylene vinyl acetate rubbers, epichlorohydrin rubbers, chlorinated polyethylene rubbers, chlorosulfonated polyethylene rubbers, hydrogenated nitrile rubbers, and tetrafluoroethylene-propylene rubbers.

In some implementations of the compositions of this invention, the elastomer composition comprises a combination of natural rubber and synthetic rubber. For example, in some cases, a synthetic rubber, such as a diene-containing rubber, such as SBR and/or EPDM, may be combined with a natural rubber, such as SMR, SIR, and/or SVR, in relative amounts of, for example, at least 1 part, such as 1 to 10 parts, 1 to 5 parts, or 2 to 4 parts, synthetic rubber to 1 part natural rubber.

In some implementations, the polymer matrix is present in the elastomer compositions of this specification in an amount of at least 20% by weight—such as 20 to 90% by weight, 20 to 80% by weight, or 30 to 60% by weight, based on the total weight of the elastomer composition.

As previously indicated, elastomer compositions of this specification comprise a solid isocyanate residue. The term "isocyanate residue" means a non-distillable by-product of a polyisocyanate production process that involves reaction of an amine with phosgene.

In some implementations, the solid isocyanate residue has a content of bound isocyanate that is at least 0.1% by weight and/or less than 10% by weight, based on the total weight of the solid isocyanate residue and/or is the phosgenation product of toluene diamine containing less than 0.5% by weight of ortho-toluenediamine isomers, based on the total weight of toluene diamine. As used herein, "bound isocyanate" refers to isocyanate functionality covalently bonded to the crosslinked polymer that is in the isocyanate residue. In addition, the isocyanate residue may be substantially free (<10 ppm, such as <5 ppm), in some cases completely free (0 ppm), of isocyanate functionality that is not bound isocyanate.

More particularly, in some embodiments, the solid isocyanate residue is an organic particulate comprising: (i) a crosslinked polymer comprising aromatic groups, biuret groups, urea groups, and carbodiimide groups (and sometimes a content of isocyanate groups); and (ii) a high-boiling hydrocarbon. As used herein with reference to component (i) above, the term "polymer" encompasses oligomers and both homopolymers and copolymers; the prefix "poly" referring to two or more. Also, as used herein with reference to component (i) above, "crosslinked polymer" means that the chains of the polymer are linked to one another by covalent bonds so that the polymer, as a network, is insoluble in inert organic solvents and cannot be melted without decomposing.

The solid isocyanate residue is, as previously indicated, a by-product of a process used to manufacture an aromatic polyisocyanate. More particularly, in some implementations, the solid isocyanate residue is produced by drying a mixture comprising: (i) a residue, i.e., a by-product, of a process for producing an aromatic polyisocyanate by the reaction of a corresponding amine with phosgene; and (ii) a high-boiling hydrocarbon. As used herein, the term "high-boiling hydrocarbon" encompasses pure hydrocarbons and industrial mixtures that have a boiling point which is different from the boiling point of the polyisocyanate produced by the process resulting in the residue by at least 150° C. at 15 mbar absolute pressure.

For example, in some implementations, the solid isocyanate residue is the product of a process for the production of a pure, distilled aromatic polyisocyanate by (1) the reaction of the corresponding amine with phosgene in a suitable solvent and multi-stage distillative work-up of the isocyanate solution obtained to recover pure isocyanate, pure solvent and an isocyanate-containing residue, and (2) continuously feeding the residue obtained from the distillation process and from 2 to 50 weight % of a high-boiling hydrocarbon which is inert under the distillation conditions to a heated, product-agitating vacuum drier with a horizontal shaft. In such a process, the fraction of polyisocyanate still present is continuously distilled off from the residue at a temperature of from 160° to 280° C. and a pressure of from 2 to 50 mbar. The remaining residue is continuously discharged as a pourable, non-dusting, granular material, which is cooled and ground to a desired particle size.

Residues from synthesis of a variety of aromatic polyisocyanates are suitable for use in the inventions of this specification. Suitable aromatic polyisocyanates include, for example, 1,3-phenylene diisocyanate, 1,4-phenylene diisocyanate, 2,6-toluene diisocyanate, 2,4-toluene diisocyanate, 1,3-xylylene diisocyanate, 1,4-xylylene diisocyanate, tetramethylxylene diisocyanate, 1,5-naphthalene diisocyanate, diphenyl oxide 4,4'-diisocyanate, 4,4'-methylenediphenyl diisocyanate, 2,4'-methylenediphenyl diisocyanate, 2,2'-diisocyanatodiphenylmethane, diphenylmethanediisocyanate, 3,3'-dimethyl-4,4'-biphenylene isocyanate, 3,3'-dimethoxy-4,4'-biphenylene diisocyanate, benzene, 1-[(2,4-diisocyanatophenyl)methyl]-3-isocyanato-2-methyl, 2,4,6-triisopropyl-m-phenylene diisocyanate, and triphenylmethane-4,4',4"-triisocyanate, tris(p-isocyanatophenyl)thiophosphate.

The residue stream, i.e., that chemical mixture containing the by-product being formed during distillation of the amine/phosgene reaction mixture often contains from 20 to 80 weight %, such as 40 to 60 weight %, of monomeric isocyanate in addition to polymeric products. In the practice of the process described above, this isocyanate-containing residue may be fed to the drier separately from the hydrocarbons in a plurality of partial streams. In some implementations, at least a portion of the isocyanate-containing residue is mixed with the hydrocarbon and fed to the drier. The remainder of the residue may then be fed to the drier in one or more partial streams.

A continuously operating contact drier which has a double shell for heating, has a horizontal shaft which agitates the product and is heated is, in some implementations, used as the drier in the production of the solid isocyanate residue used in the production of the rubber compositions of the present specification. In certain embodiments, the drier has a plurality of nozzles for product admission, one nozzle for product discharge, and vapor discharge nozzles of large dimensions for the isocyanate and solvent which are separated from the residue during the distillation. Both single-shaft driers and double-shaft or screw feed apparatuses may be used.

Condensate formed from vapors generated during the process (e.g., in a vapor offtake system) may be used to remove dust deposits such as those which may be formed on the walls of the apparatus at the point where vapors are removed from the system (e.g., the vapor offtake system). These condensates are often separately discharged.

In some implementations of the process for preparing the solid isocyanate residue that is used in producing the elastomer compositions of this specification, the reactor is operated at a temperature of 160° C. to 280° C., such as 200° C. to 250° C., under a pressure of 2 to 50 mbar, such as 10 to 20 mbar, at a throughput of up to 250 kg/hour per m$^2$ of heating surface. The continuous distillation is often conducted in a product-agitating drier with a horizontal shaft, to which a condensation system is attached. Distillation is carried out in the presence of one or more hydrocarbons, which are admixed in an amount of from 1 to 50 weight %, such as 3 to 10 weight %, based on the weight of the residue being treated. Suitable hydrocarbons include, but are not limited to, asphalts, such as those which occur industrially as by-products in the refining of crude oil. Specific non-limiting examples of suitable bitumens are those of grades 6/12, 10/20, 20/30, 30/40, 40/50, 60/70, 80/100, 100/120, and 180/200.

Suitable processes and equipment for producing the solid isocyanate residue suitable for use in the elastomer compositions of this specification are also described in U.S. Pat. No. 5,446,196, at col. 2, line 18 to col. 4, line 2, the cited portion of which being incorporated herein by reference.

The solid isocyanate residue, prior to inclusion in the elastomer composition, is ground to a small and generally uniform particle size. Size reduction of the solid isocyanate residue could be conducted by dry milling using a ball mill, agitated ball mill, jet mill or attrition mill. Generally a distribution of particle sizes results from such a grinding process. The particle size characteristics, including the size distribution, may have an effect on the performance in the application. In some implementations, the solid isocyanate residue, prior to inclusion in the elastomer composition, is ground to a $D_{90,3}$ particle size of no more than 70 microns, in some cases, no more than 60 microns or no more than 50 microns. In some implementations, the solid isocyanate residue is prior to inclusion in the elastomer composition, is ground to a $D_{50,3}$ particle size of no more than 50 microns, no more than 25 microns, or, in some cases, no more than 10 microns. In some implementations, the solid isocyanate residue is prior to inclusion in the elastomer composition, is ground to a $D_{10,3}$ particle size of no more than 20 microns, no more than 10 microns, or, in some cases, no more than 5 microns. The particle sizes reported herein are according to ISO 13320;2020 and are determined by laser diffraction particle size analysis, as described by ISO 13320:2020.

In certain embodiments, the solid isocyanate residue has a Mohs hardness of 2 to 4, and/or a specific gravity of 1.2 to 1.4. Furthermore, in certain embodiments, the ash content of the particulate is less than 0.5% by weight, and when heated under a nitrogen atmosphere, the particulate shows no discernable melting point. In certain embodiments, the particulate is insoluble in water at room temperature and pressure, and has a solubility of less than 5% at room temperature/pressure in any of the following organic solvents: acetone, chlorobenzene, xylenes, dimethylformamide, dimethylsulfoxide, dimethylacetamide, 1:1 mixture of acetone:aromatic 100, carbon disulfide, chloroform, methylene chloride, or tetrahydrofuran.

In some implementations, the content of high-boiling hydrocarbon in the solid isocyanate residue is 1 to 10% by weight, such as 2 to 6% by weight, or 3 to 5% by weight, based on the total weight of the solid organic particulate.

As indicated, the solid isocyanate residue is present in the elastomer compositions of this specification in an amount of 0.1 to 70% by weight, based on the total weight of the elastomer composition. In some implementations, the solid isocyanate residue is present in the elastomer compositions of this specification in an amount of 0.1 to 50% by weight, 1 to 50% by weight, 1 to 20% by weight, 5 to 20% by weight, or 5 to 15% by weight, based on the total weight of the elastomer composition.

It has been discovered that the solid isocyanate residue described herein can function, in at least some cases, as suitable reinforcing filler in elastomer compositions. More specifically, in some cases, the solid isocyanate residue can act as a suitable complete or partial replacement for reinforcing fillers often used in elastomer compositions, such as carbon black, calcium carbonate, calcined clay, magnesium silicate, aluminum silicate, silicon dioxide, and magnesium carbonate. Moreover, by at least partially replacing carbon black and/or other reinforcing filler often used in elastomer compositions with the solid isocyanate residue described herein, it is possible to provide an elastomer composition having reduced weight but, in some cases, at least similar physical properties. Weight reduction can be particularly desirable in certain applications of the elastomer compositions described herein, especially when used in aviation and automotive applications, such when used as a door seal, a window seal, a trunk seal, a hood seal, or when used to construct hoses in a vehicular cooling system circuit or to construct hanger elements that attach exhaust systems to the vehicle underfloor.

Nevertheless, in some implementations, carbon black may also be used in the elastomer compositions of this specification. In some implementations, the carbon black may have a surface area (EMSA) of at least 20 m$^2$/g, such as 35 m$^2$/g to 200 m$^2$/g, as determined by ASTM D6556-19a. Specific examples of suitable carbon blacks include, but are not limited to, N110, N220, N326, N330, N339, N330, N343, N351, N550, N650, N660 and N774, as designated by ASTM D1765-19. The carbon blacks utilized may be in pelletized form or an unpelletized flocculent mass.

In some implementations, carbon black is present in the elastomer compositions of this specification in an amount of 1 to 50% by weight, 5 to 50% by weight, 10 to 50% by weight, 20 to 50% by weight, or 30 to 40% by weight, based on the total weight of the elastomer composition. In some implementations, the solid isocyanate residue and carbon black are present in a relative ratio, by weight, of 1:10 to 10:1, such as 1:1 to 10:1 or 1:1 to 5:1.

As will be appreciated, other reinforcing fillers, such as calcium carbonate, calcined clay, magnesium silicate, aluminum silicate, silicon dioxide, and magnesium carbonate, or a mixture of any two or more thereof, can be used if desired.

The elastomer compositions of this specification may comprise any of a variety of additional ingredients. For example, in some implementations, the elastomer compositions include any of a variety of materials that may function as a processing aid for the elastomer composition. Suitable processing aids include, but are not limited to, stearic acid, pine tar, motor oil, aromatic oil, naphthenic oil, paraffin oil, coumarone, RX-80, paraffin, liquid polyisobutene, and dioctyl sebacate, as well as any mixture of two or more thereof.

In some implementations, the processing aid, such as any of those mentioned above, is present in an amount of 0.1 to 50 parts by weight, such as 0.1 to 20 parts by weight, 0.1 to 10 parts by weight, 1 to 10 parts by weight, or 1 to 5 parts by weight, based on 100 parts by weight of the polymer matrix in the elastomer composition.

In addition, in some implementations, the elastomer compositions of this specification include a vulcanization activator, such as a metal oxides and higher fatty acids (such as stearic acid or lauric acid) and their salts. Suitable metal oxides include, without limitation, zinc oxide and magnesium oxide or a mixture thereof. In some implementations, the vulcanization activator, such as the aforementioned metal oxides and fatty acids, is present in an amount of 0.1 to 50 parts by weight, such as 0.1 to 20 parts by weight, 0.1 to 10 parts by weight, 1 to 10 parts by weight, or 1 to 5 parts by weight, based on 100 parts by weight of the rubber matrix in the elastomer composition.

In some implementations, the elastomer composition includes a vulcanizing agent to cure the elastomer composition. Suitable vulcanizing agents include, but are not limited to, sulfur and peroxide-based vulcanizing agents. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur.

In certain embodiments, the vulcanizing agent, such as a sulfur and/or peroxide-based vulcanizing agent, is present in the elastomer composition in an amount of 0.1 to 10 parts by weight, such as 0.5 to 5 parts by weight or 1 to 4 parts by weight, based on 100 parts by weight of the polymer matrix in the elastomer composition.

In addition, in some implementations, the elastomer composition may include a vulcanization accelerator. Such an accelerator may, if desired, be used with a vulcanizing agent to control the time and/or temperature required for vulcanization and to improve properties of the vulcanizate. Examples of suitable vulcanization accelerators include, for example, thiazols, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and N,N-Dicyclohexyl-2-benzothiazolesulfenamide (DCBS); guanidines, such as diphenylguanidine (DPG); amines; disulfides, such as tetramethylthium disulfide (TMTD); thiurams, such as tetramethylthiuram monosulfide (TMTM); sulfenamides; dithiocarbamates; xanthates; and thioureas; as well as mixtures of any two or more of the foregoing.

The elastomer compositions of this specification may, if desired, include other fillers including mineral fillers, such as aluminum silicate, calcium silicate, magnesium silicate, clay (hydrous aluminum silicate), talc (hydrous magnesium silicate), and mica, and non-mineral fillers, such as urea and sodium sulfate.

The elastomer compositions of this specification can be producing using any of a variety of techniques, such as the technique described in the Examples. In some implementations, the polymer matrix, solid isocyanate residue, any other reinforcing fillers, processing aids and vulcanization activator may be mixed together using any suitable mixer to produce a master batch. Thereafter, a vulcanization agent and vulcanization accelerator may be added to the master batch to produce the elastomer composition that is ready for extrusion, forming and vulcanization. Vulcanization of the elastomer composition may comprise depositing the elastomer composition into a cavity of a mold, vulcanizing on a press vulcanizer by pressing, and releasing from the mold to obtain a vulcanized elastomer.

The elastomer compositions described herein can be used for various purposes. For example, they can be used for tire treadstock, sidewall stock or other tire component stock compounds. They may be used to produce a roofing membrane. In addition, they may be used to produce other automotive components, such as door seals, window seals, trunk seals, hood seals, hoses in a vehicular cooling system circuit, and hanger elements that attach exhaust systems to the vehicle underfloor.

Various aspects of the subject matter described herein are set out in the following numbered clauses:

Clause 1. An elastomer composition comprising: (a) at least 20% by weight, based on the total weight of the elastomer composition, of a polymer matrix; and (b) 0.1 to 70% by weight, based on the total weight of the elastomer composition, of a solid isocyanate residue having, prior to its inclusion in the elastomer composition, a $D_{90,3}$ particle size of no more than 70 microns.

Clause 2. The elastomer composition of clause 1, wherein the polymer matrix comprises a natural rubber, such as standard malaysian rubber, standard vietnamese rubber, standard indonesian rubber, ribbed smoked sheet Nos. 1 to 6, pale crepe Nos. 1 to 3, or a combination of any two or more thereof.

Clause 3. The elastomer composition of one of clause 1 or clause 2, wherein the polymer matrix comprises a synthetic thermosetting polymer, such as an ethylene-propylene rubber, a silicone rubber, a fluoroelastomer, a polysulfide, a polycarbonate, a polycarbonate-urethane, a polyacrylate, an ethylene acrylic rubber, an ethylene vinyl acetate rubber, an epichlorohydrin rubber, a chlorinated polyethylene rubber, a chlorosulfonated polyethylene rubber, a hydrogenated nitrile rubber, and/or a tetrafluoroethylene-propylene rubber.

Clause 4. The elastomer composition of clause 3, wherein the synthetic thermosetting polymer comprises a diene-containing rubber, such as a polyisoprene rubber, a styrene-isoprene rubber, a neoprene rubber, a chloroprene rubber, a styrene-butadiene rubber, a styrene-isoprene-butadiene rubber, a butadiene-isoprene rubber, a polybutadiene rubber, a butyl rubber, a halobutyl rubbers, an ethylene-propylene rubber, such as an ethylene-propylene diene rubber, an acrylonitrile-butadiene rubber, or a combinations of any two or more of the foregoing.

Clause 5. The elastomer composition of one of clause 1 to clause 4, wherein the polymer matrix comprises a synthetic thermoplastic polymer, such as a styrenic block copolymer, a thermoplastic polyolefin, a thermoplastic vulcanizate, a thermoplastic polyurethane, a thermoplastic copolyester, a thermoplastic polyamide, or a combination of any two or more of the foregoing.

Clause 6. The elastomer composition of any one of clause 1 to clause 5, wherein the polymer matrix comprises a natural rubber and synthetic rubber, such as a combination of a diene-containing rubber, such as SBR and/or EPDM, and SMR, SIR, and/or SVR, in relative amounts of, for example, at least 1 part, such as 1 to 10 parts, 1 to 5 parts, or 2 to 4 parts, synthetic rubber to 1 part natural rubber.

Clause 7. The elastomer composition of any one of clause 1 to clause 6, wherein the polymer matrix is present in the elastomer composition in an amount of at least 20% by weight, such as 20 to 90% by weight, 20 to 80% by weight, or 30 to 60% by weight, based on the total weight of the elastomer composition.

Clause 8. The elastomer composition of any one of clause 1 to clause 7, wherein the solid isocyanate residue has a content of bound isocyanate that is at least 0.1% by weight and/or less than 10% by weight, based on the total weight of the solid isocyanate residue and/or is the phosgenation product of toluene diamine containing less than 0.5% by weight of ortho-toluenediamine isomers, based on the total weight of toluene diamine.

Clause 9. The elastomer composition of any one of clause 1 to clause 8, wherein the solid isocyanate residue is an organic particulate comprising: (i) a crosslinked polymer comprising aromatic groups, biuret groups, urea groups, and carbodiimide groups (and sometimes a content of isocyanate groups); and (ii) a high-boiling hydrocarbon.

Clause 10. The elastomer composition of any one of clause 1 to clause 9, wherein the solid isocyanate residue is produced by drying a mixture comprising: (i) a residue of a process for producing an aromatic polyisocyanate by the reaction of a corresponding amine with phosgene; and (ii) a high-boiling hydrocarbon.

Clause 11. The elastomer composition of any one of clause 1 to clause 10, wherein the solid isocyanate residue is the product of a process comprising: (1) the reaction of the amine corresponding to the isocyanate with phosgene in a suitable solvent and multi-stage distillative work-up of the isocyanate solution obtained to recover pure isocyanate, pure solvent and an isocyanate-containing residue; (2) continuously feeding the residue obtained from the distillation process and from 2 to 50 weight % of a high-boiling hydrocarbon which is inert under the distillation conditions to a heated, product-agitating vacuum drier with a horizontal shaft, wherein the fraction of polyisocyanate still present is continuously distilled off from the residue at a temperature of from 160° to 280° C. and a pressure of from 2 to 50 mbar; and (3) continuously discharging remaining residue as a pourable, non-dusting, granular material, which is cooled and ground to a desired particle size.

Clause 12. The elastomer composition of any one of clause 1 to clause 11, wherein the solid isocyanate residue comprises a residue from the synthesis of an aromatic polyisocyanate, such as 1,3-phenylene diisocyanate, 1,4-phenylene diisocyanate, 2,6-toluene diisocyanate, 2,4-toluene diisocyanate, 1,3-xylylene diisocyanate, 1,4-xylylene diisocyanate, tetramethylxylene diisocyanate, 1,5-naphthalene diisocyanate, diphenyl oxide 4,4'-diisocyanate, 4,4'-methylenediphenyl diisocyanate, 2,4'-methylenediphenyl diisocyanate, 2,2'-diisocyanatodiphenylmethane, diphenylmethanediisocyanate, 3,3'-dimethyl-4,4'-biphenylene isocyanate, 3,3'-dimethoxy-4,4'-biphenylene diisocyanate, benzene, 1-[(2,4-diisocyanatophenyl)methyl]-3-isocyanato-2-methyl, 2,4,6-triisopropyl-m-phenylene diisocyanate, and triphenylmethane-4,4',4"-triisocyanate, tris(p-isocyanatophenyl)thiophosphate, or a combination of any two or more thereof.

Clause 13. The elastomer composition of any one of clause 1 to clause 12, wherein the solid isocyanate residue has a $D_{90}$ particle size of no more than 60 microns or no more than 50 microns.

Clause 14. The elastomer composition of any one of clause 1 to clause 13, wherein the solid isocyanate residue, prior to inclusion in the rubber composition, has a $D_{50}$ particle size of no more than 50 microns, no more than 25 microns, or no more than 10 microns.

Clause 15. The elastomer composition of any one of clause 1 to clause 14, the solid isocyanate residue, prior to inclusion in the elastomer composition, has a $D_{10,3}$ particle size of no more than 20 microns, no more than 10 microns, or no more than 5 microns.

Clause 16. The elastomer composition of any one of clause 1 to clause 15, wherein the solid isocyanate residue has a Mohs hardness of 2 to 4, a specific gravity of 1.2 to 1.4, an ash content of less than 0.5% by weight, or a combination of any two or more thereof.

Clause 17. The elastomer composition of any one of clause 9 to clause 16, wherein the content of high-boiling hydrocarbon in the solid isocyanate residue is 1 to 10% by weight, 2 to 6% by weight, or 3 to 5% by weight, based on the total weight of the solid organic particulate.

Clause 18. The elastomer composition of any one of clause 1 to clause 17, wherein the solid isocyanate residue is present in the elastomer compositions in an amount of 0.1 to 50% by weight, 1 to 50% by weight, 1 to 20% by weight, 5 to 20% by weight, or 5 to 15% by weight, based on the total weight of the elastomer composition.

Clause 19. The elastomer composition of any one of clause 1 to clause 18, wherein the elastomer composition further comprises carbon black, such as carbon black having a surface area (EMSA) of at least 20 m2/g, such as 35 m2/g to 200 m2/g, as determined by ASTM D6556-19a, such as where the carbon black comprises N110, N220, N326, N330, N339, N330, N343, N351, N550, N650, N660, N774 carbon black as designated by ASTM D1765-19, or any combination of any two or more thereof.

Clause 20. The elastomer composition of clause 19, wherein carbon black is present in the elastomer composition in an amount of 1 to 50% by weight, 5 to 50% by weight, 10 to 50% by weight, 20 to 50% by weight, or 30 to 40% by weight, based on the total weight of the elastomer composition.

Clause 21. The elastomer composition of clause 19 or clause 20, wherein the solid isocyanate residue and carbon black are present in the elastomer composition at a relative ratio, by weight, of 1:10 to 10:1, 1:1 to 10:1 or 1:1 to 5:1.

Clause 22. The elastomer composition of any one of clause 1 to clause 21, wherein the elastomer composition further comprises a filler comprising calcium carbonate, calcined clay, magnesium silicate, aluminum silicate, silicon dioxide, and magnesium carbonate, or a mixture of any two or more thereof.

Clause 23. The elastomer composition of any one of clause 1 to clause 22, wherein the elastomer composition comprises a processing aid, such as stearic acid, pine tar, motor oil, aromatic oil, naphthenic oil, paraffinic oil, coumarone, RX-80, paraffin, liquid polyisobutene, dioctyl sebacate, or a mixture of two or more thereof.

Clause 24. The elastomer composition of clause 23, wherein the processing aid is present in an amount of 0.1 to 50 parts by weight, 0.1 to 20 parts by weight, 0.1 to 10 parts by weight, 1 to 10 parts by weight, or 1 to 5 parts by weight, based on 100 parts by weight of the polymer matrix in the elastomer composition.

Clause 25. The elastomer composition of any one of clause 1 to clause 24, wherein the elastomer composition further comprises a vulcanization activator, such as a metal oxide, such as zinc oxide and/or magnesium oxide, and/or a higher fatty acid, such as stearic acid or lauric acid, or a salt thereof.

Clause 26. The elastomer composition of clause 25, wherein the vulcanization activator is present in an amount of 0.1 to 50 parts by weight, 0.1 to 20 parts by weight, 0.1 to 10 parts by weight, 1 to 10 parts by weight, or 1 to 5 parts by weight, based on 100 parts by weight of the polymer matrix in the elastomer composition.

Clause 27. The elastomer composition of any one of clause 1 to clause 26, wherein the elastomer composition comprises a vulcanizing agent, such as a sulfur-based vulcanizing agent and/or a peroxide-based vulcanizing agent, such as "rubber maker's" soluble sulfur; elemental sulfur; an organosilane polysulfide, an amine disulfide, a polymeric polysulfide, a sulfur olefin adducts, an insoluble polymeric sulfur, or a combination of any two or more thereof.

Clause 28. The elastomer composition of clause 27, wherein the vulcanizing agent is present in the elastomer composition in an amount of 0.1 to 10 parts by weight, 0.5 to 5 parts by weight, or 1 to 4 parts by weight, based on 100 parts by weight of the polymer matrix in the elastomer composition.

Clause 29. The elastomer composition of any one of clause 1 to clause 28, wherein the elastomer composition further comprises a vulcanization accelerator, such as a thiazol vulcanization accelerator, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and N,N-Dicyclohexyl-2-benzothiazolesulfenamide (DCBS), a guanidine vulcanization accelerator, such as diphenylguanidine (DPG), an amine; a disulfide, such as tetramethylthium disulfide (TMTD), a thiuram, such as tetramethylthiuram monosulfide (TMTM); a sulfenamide; a dithiocarbamate; a xanthate; a thiourea, or a mixtures of any two or more thereof.

Clause 30. An elastomer product prepared from the elastomer composition of any one of clause 1 to clause 29, wherein the elastomer product comprises a tire treadstock, a tire sidewall stock, a roofing membrane, a door seal, a window seal, a trunk seal, a hood seal, a hose, such as a hose in a vehicular cooling system circuit, or a hanger element attaching an exhaust system to a vehicle underfloor.

Clause 31. An elastomer composition comprising: (a) at least 20% by weight, based on the total weight of the elastomer composition, of a polymer matrix; and (b) 0.1 to 70% by weight, based on the total weight of the elastomer composition, of organic particulates having, prior to its inclusion in the elastomer composition, a $D_{90,3}$ particle size of no more than 70 microns, the organic particulates comprising: (i) a crosslinked polymer comprising aromatic groups, biuret groups, urea groups, and carbodiimide groups; and (ii) a high-boiling hydrocarbon.

Clause 32. The elastomer composition of clause 31, wherein the polymer matrix comprises a NR, such as SMR, SVR, SIR, RSS No. 1 to 6, and/or pale crepe No. 1 to 3.

Clause 33. The elastomer composition of one of clause 31 or clause 32, wheren the polymer matrix comprises a synthetic thermosetting polymer, such as an ethylene-propylene rubber, a silicone rubber, a fluoroelastomer, a polysulfide, a polycarbonate, a polycarbonate-urethane, a polyacrylate, an ethylene acrylic rubber, an ethylene vinyl acetate rubber, an epichlorohydrin rubber, a chlorinated polyethylene rubber, a chlorosulfonated polyethylene rubber, a hydrogenated nitrile rubber, and/or a tetrafluoroethylene-propylene rubber.

Clause 34. The elastomer composition of clause 33, wherein the synthetic thermosetting polymer comprises a diene-containing rubber, such as a polyisoprene rubber, a styrene-isoprene rubber, a neoprene rubber, a chloroprene rubber, a styrene-butadiene rubber, a styrene-isoprene-butadiene rubber, a butadiene-isoprene rubber, a polybutadiene rubber, a butyl rubber, a halobutyl rubbers, an ethylene-propylene rubber, such as an ethylene-propylene diene rubber, an acrylonitrile-butadiene rubber, or a combinations of any two or more thereof.

Clause 35. The elastomer composition of one of clause 31 to clause 34, wherein the polymer matrix comprises a synthetic thermoplastic polymer, such as a styrenic block copolymer, a thermoplastic polyolefin, a thermoplastic vulcanizate, a thermoplastic polyurethane, a thermoplastic copolyester, a thermoplastic polyamide, or a combination of any two or more of the foregoing, a natural rubber, such as standard malaysian rubber, standard vietnamese rubber, standard indonesian rubber, ribbed smoked sheet Nos. 1 to 6, pale crepe Nos. 1 to 3, or a combination of any two or more thereof.

Clause 36. The elastomer composition of any one of clause 31 to clause 35, wherein the polymer matrix comprises a natural rubber and synthetic rubber, such as a combination of a diene-containing rubber, such as SBR and/or EPDM, and SMR, SIR, and/or SVR, in relative amounts of, for example, at least 1 part, such as 1 to 10 parts, 1 to 5 parts, or 2 to 4 parts, synthetic rubber to 1 part natural rubber.

Clause 37. The elastomer composition of any one of clause 31 to clause 36, wherein the polymer matrix is present in the elastomer composition in an amount of at least 20% by weight—such as 20 to 90% by weight, 20 to 80% by weight, or 30 to 60.

Clause 38. The elastomer composition of any one of clause 31 to clause 37, wherein the solid isocyanate residue has a content of bound isocyanate that is at least 0.1% by weight and/or less than 10% by weight, based on the total weight of the solid isocyanate residue and/or is the phosgenation product of toluene diamine containing less than 0.5% by weight of ortho-toluenediamine isomers, based on the total weight of toluene diamine.

Clause 39. The elastomer composition of any one of clause 31 to clause 38 wherein the organic particulates are a solid isocyanate residue produced by drying a mixture comprising: (i) a residue of a process for producing an aromatic polyisocyanate by the reaction of a corresponding amine with phosgene; and (ii) a high-boiling hydrocarbon.

Clause 40. The elastomer composition of any one of clause 31 to clause 39, wherein the organic particulates are the product of a process comprising: (1) the reaction of the amine corresponding to the isocyanate with phosgene in a suitable solvent and multi-stage distillative work-up of the isocyanate solution obtained to recover pure isocyanate, pure solvent and an isocyanate-containing residue; (2) continuously feeding the residue obtained from the distillation process and from 2 to 50 weight % of a high-boiling hydrocarbon which is inert under the distillation conditions to a heated, product-agitating vacuum drier with a horizontal shaft, wherein the fraction of polyisocyanate still present is continuously distilled off from the residue at a temperature of from 160° to 280° C. and a pressure of from 2 to 50 mbar; and (3) continuously discharging remaining residue as a pourable, non-dusting, granular material, which is cooled and ground to a desired particle size.

Clause 41. The elastomer composition of any one of clause 31 to clause 40, wherein the organic particulates comprise a residue from the synthesis of an aromatic polyisocyanate, such as 1,3-phenylene diisocyanate, 1,4-phenylene diisocyanate, 2,6-toluene diisocyanate, 2,4-toluene diisocyanate, 1,3-xylylene diisocyanate, 1,4-xylylene diisocyanate, tetramethylxylene diisocyanate, 1,5-naphthalene diisocyanate, diphenyl oxide 4,4'-diisocyanate, 4,4'-methylenediphenyl diisocyanate, 2,4'-methylenediphenyl diisocyanate, 2,2'-diisocyanatodiphenylmethane, diphenylmethanediisocyanate, 3,3'-dimethyl-4,4'-biphenylene isocyanate, 3,3'-dimethoxy-4,4'-biphenylene diisocyanate, benzene, 1-[(2,4-diisocyanatophenyl)methyl]-3-isocyanato-2-methyl, 2,4,6-triisopropyl-m-phenylene diisocyanate, and triphenylmethane-4,4',4"-triisocyanate, tris(p-isocyanatophenyl)thiophosphate, or a combination of any two or more thereof.

Clause 42. The elastomer composition of any one of clause 31 to clause 41, wherein the organic particulates have a $D_{90,3}$ particle size of no more than 60 microns or no more than 50 microns.

Clause 43. The elastomer composition of any one of clause 31 to clause 42, wherein the organic particulates, prior to inclusion in the elastomer composition, have a $D_{50,3}$ particle size of no more than 50 microns, no more than 25 microns, or no more than 10 microns.

Clause 44. The elastomer composition of any one of clause 30 to clause 41, wherein the organic particulates, prior to inclusion in the elastomer composition, have a $D_{10,3}$ particle size of no more than 20 microns, no more than 10 microns, or no more than 5 microns.

Clause 45. The elastomer composition of any one of clause 31 to clause 44, wherein the organic particulates have a Mohs hardness of 2 to 4, a specific gravity of 1.2 to 1.4, an ash content of less than 0.5% by weight, or a combination of any two or more thereof.

Clause 46. The elastomer composition of any one of clause 39 to clause 45, wherein the content of high-boiling hydrocarbon in the organic particulates is 1 to 10%, 2 to 6%, or 3 to 5% by weight, based on the total weight of the solid organic particulate.

Clause 47. The elastomer composition of any one of clause 31 to clause 46, wherein the organic particulates are present in the elastomer compositions in an amount of 0.1 to 50% by weight, 1 to 50% by weight, 1 to 20% by weight, 5 to 20% by weight, or 5 to 15% by weight, based on the total weight of the elastomer composition.

Clause 48. The elastomer composition of any one of clause 31 to clause 47, wherein the elastomer composition further comprises carbon black, such as carbon black having a surface area (EMSA) of at least 20 m2/g, such as 35 m2/g to 200 m2/g, as determined by ASTM D6556-19a, such as where the carbon black comprises N110, N220, N326, N330, N339, N330, N343, N351, N550, N650, N660, N774 carbon black as designated by ASTM D1765-19, or any combination of any two or more thereof.

Clause 49. The elastomer composition of clause 48, wherein carbon black is present in the elastomer composition in an amount of 1 to 50% by weight, 5 to 50% by weight, 10 to 50% by weight, 20 to 50% by weight, or 30 to 40% by weight, based on the total weight of the elastomer composition.

Clause 50. The elastomer composition of clause 48 or clause 49, wherein the organic particulates and carbon black are present in the elastomer composition at a relative ratio, by weight, of 1:10 to 10:1, 1:1 to 10:1 or 1:1 to 5:1.

Clause 51. The elastomer composition of any one of clause 31 to clause 50, wherein the elastomer composition further comprises a filler comprising calcium carbonate, calcined clay, magnesium silicate, aluminum silicate, silicon dioxide, and magnesium carbonate, or a mixture of any two or more thereof.

Clause 52. The elastomer composition of any one of clause 31 to clause 51, wherein the elastomer composition comprises a processing aid, such as stearic acid, pine tar, motor oil, aromatic oil, naphthenic oil, paraffin oil, coumarone, RX-80, paraffin, liquid polyisobutene, dioctyl sebacate, or a mixture of two or more thereof.

Clause 53. The elastomer composition of clause 52, wherein the processing aid is present in an amount of 0.1 to 50 parts by weight, 0.1 to 20 parts by weight, 0.1 to 10 parts by weight, 1 to 10 parts by weight, or 1 to 5 parts by weight, based on 100 parts by weight of the polymer matrix in the elastomer composition.

Clause 54. The elastomer composition of any one of clause 31 to clause 53, wherein the elastomer composition further comprises a vulcanization activator, such as a metal oxide, such as zinc oxide and/or magnesium oxide, and/or a higher fatty acid, such as stearic acid or lauric acid, or a salt thereof.

Clause 55. The elastomer composition of clause 54, wherein the vulcanization activator is present in an amount of 0.1 to 50 parts by weight, 0.1 to 20 parts by weight, 0.1 to 10 parts by weight, 1 to 10 parts by weight, or 1 to 5 parts by weight, based on 100 parts by weight of the polymer matrix in the elastomer composition.

Clause 56. The elastomer composition of any one of clause 31 to clause 55, wherein the elastomer composition comprises a vulcanizing agent, such as a sulfur-based and/or a peroxide-based vulcanizing agent, such as "rubber maker's" soluble sulfur; elemental sulfur; an organosilane polysulfide, an amine disulfide, a polymeric polysulfide, a sulfur olefin adducts, an insoluble polymeric sulfur, or a combination of any two or more thereof.

Clause 57. The elastomer composition of clause 56, wherein the vulcanizing agent is present in the elastomer composition in an amount of 0.1 to 10, 0.5 to 5, or 1 to 4 parts by weight, based on 100 parts by weight of the polymer matrix in the elastomer composition.

Clause 58. The elastomer composition of any one of clause 31 to clause 57, wherein the elastomer composition further comprises a vulcanization accelerator, such as a thiazol vulcanization accelerator, such as 2-mercaptobenzothiazol, dibenzothiazyl disulfide, CBS, TBBS, and DCBS, a guanidine vulcanization accelerator, such as DPG, an amine; a disulfide, such as TMTD, a thiuram, such as TMTM; a sulfenamide; a dithiocarbamate; a xanthate; a thiourea, or a mixtures of any two or more thereof.

Clause 59. An elastomer product prepared from the elastomer composition of any one of clause 31 to clause 58, wherein the elastomer product comprises a tire treadstock, a tire sidewall stock, a roofing membrane, a door seal, a window seal, a trunk seal, a hood seal, a hose, such as a hose in a vehicular cooling system circuit, or a hanger element attaching an exhaust system to a vehicle underfloor.

EXAMPLES

Example 1

Elastomer compositions were prepared using the ingredients, amounts and procedure set forth in Table 1, in which the listed amounts are in parts per hundred parts of rubber, "PHR", and in which:

SSBR refers to solution styrene-butadiene copolymer rubber, commercially available as Buna® 4525-0 from Arlanxeo Performance Elastomers; NR refers to natural rubber (Indonesian or Malaysian); Carbon Black 1: carbon black grade N330 according to ASTM D1765-19; Residue 1 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed in an attrition mill to give a fine powder with a $D_{10,3}$ particle size of 4.8 microns, a $D_{50,3}$ particle size of 22.0 microns, and a $D_{90,3}$ particle size of 52.2 microns, determined by laser diffraction particle size analysis (ISO 13320:2020); MgO refers to magnesium oxide, Elastomag® 170; TBBS refers to N-tert-butyl-2-benzothiazyl sulfonamide; and DCBS refers to N,N-Dicyclohexyl-2-benzothiazolesulfenamide.

Elastomers were prepared using a two-part mixing in lab scale Banbury mixer according to ASTM D3182-16.

TABLE 1

| Master Batch - 1st Pass | Example 1A | Example 1B | Example 1C | Example 1D |
| --- | --- | --- | --- | --- |
| SSBR | 75.00 | 75.00 | 75.00 | 75.00 |
| NR | 25.00 | 25.00 | 25.00 | 25.00 |
| Carbon black 1 | 60.00 | 54.00 | 45.00 | 30.00 |
| Residue 1 | — | 6.00 | 15.00 | 30.00 |
| Naphthenic oil | 3.00 | 3.00 | 3.00 | 3.00 |
| Stearic Acid | 1.00 | 1.00 | 1.00 | 1.00 |
| MgO | 0.25 | 0.25 | 0.25 | 0.25 |
| Total | 164.25 | 164.25 | 164.25 | 164.25 |

| Final Pass | Example 1A | Example 1B | Example 1C | Example 1D |
| --- | --- | --- | --- | --- |
| Master Batch - 1st Pass | 164.25 | 164.25 | 164.25 | 164.25 |
| Zinc oxide | 2.50 | 2.50 | 2.50 | 2.50 |
| Sulfur | 1.50 | 1.50 | 1.50 | 1.50 |
| TBBS | 1.00 | 1.00 | 1.00 | 1.00 |
| DCBS | 0.50 | 0.50 | 0.50 | 0.50 |
| Total | 169.75 | 169.75 | 169.75 | 169.75 |

Summary of Mixing Procedure:

| 1st Pass Master Batch | | Final Pass | |
| --- | --- | --- | --- |
| 0 min | Add polymers | 0 min | SANDWICH IN CURES[1] |
| 1 min | Add ½ of Carbon Black 1 and Residue 1 | 82.2° C. | SWEEP[2] |
| 2 min | Add remaining ingredients | 98.9° C. | DUMP[3] |
| 98.9° C. | SWEEP | | |
| 121° C. | SWEEP | | |
| 138° C. | SWEEP | | |
| 154.4° C. | DUMP | | |

[1]"SANDWICH IN CURES" means that half of the master batch was added to the mixer, all the curatives were added, and then add the remaining master batch was added.
[2]"SWEEP" means that the ram was raised and then a scraper or brush was used to "sweep" loose powder/ingredients off of the ram and back down into the mixing chamber, the ram was then lowered back down.
[3]"DUMP" means to discharge the batch from the mixer into a pan.

The elastomers were evaluated for various properties as set forth in Table 2.

| Property | Example 1A | Example 1B | Example 1C | Example 1D |
| --- | --- | --- | --- | --- |
| Minimum viscosity[1], MU | 77.42 | 72.21 | 61.65 | 51.11 |
| Curing and Molding Data (according to ASTM D3182-16)[2] | | | | |
| Cure Time, slabs | 14 minutes | 17 minutes | 21 minutes | 24 minutes |
| Cure Time, buttons | 19 minutes | 22 minutes | 26 minutes | 29 minutes |
| Physical Properties[3] | | | | |
| 100% modulus, MPa | 3.20 | 3.17 | 2.85 | 2.46 |
| 300% modulus, MPa | 16.29 | 14.88 | 10.20 | 5.54 |
| Tensile strength at Break, MPa | 23.01 | 20.37 | 18.77 | 13.13 |
| % Elongation at Break | 431 | 386 | 498 | 560 |
| Tear Property[4], kN/m | 78.1 | 63.9 | 64.8 | 50.1 |
| Schob Rebound Resilience[5], % | 52.8 | 53.0 | 56.8 | 60.8 |
| Shore A hardness at 23° C. | 67 | 67 | 66 | 62 |
| Phillips Dispersion Rating | 4 | 4 | 4 | 4 |

[1]Mooney Scorch Test. Monsanto MV 2000 Viscometer. 121.1° C., Large rotor, according to ASTM D1646-19a
[2]Test plaque size: 6 inches × 6 inches × 0.075 inches
[3]Stress-strain properties as determined according to ASTM D412-16 and D2240-15
[4]Determined at 23° C. according to ASTM D624-00 (2020), Die C. Specimens were pulled at a constant rate of 0.508 m/min.
[5]According to ASTM D7121-05(2018); median of three measurements is reported While the dispersion of the four specimens were scored to the same value on the Phillips Dispersion Rating scale, photographs of the specimens appeared to show that the dispersion for the rubber specimens that contained higher levels of Residue 1 may have been slightly poorer, i.e., that graininess may have increased as Residue 1 content increased. The physical properties results demonstrate the use of Residue 1 as a partial substitute for Carbon Black 1 at levels up to 10% is not expected to have a major discernable effect either positive or negative in unaged rubber properties. At substitution levels of 25 or 50%, the stress strain properties of the rubber compound may be diminished somewhat but may still be acceptable depending on the requirements of the application.

New specimens were molded from the previously mixed batches. The new specimens were characterized for unaged properties. Heat aged properties were then determined by conditioning samples in an air oven held at 71° C. for 168 and 336 hours according to ASTM D 573-04(2019). Following the heat aging, Shore A hardness and stress-strain properties were measured according to the applicable ASTM procedures. Results are shown in Table 3 (168 hours) and Table 4 (336 hours).

TABLE 3

| Property | Ex. 1A | Ex. 1B | Ex. 1C | Ex. 1D |
| --- | --- | --- | --- | --- |
| Shore A Durometer | 69 | 70 | 68 | 65 |
| Durometer, points change (from unaged specimen) | 4 | 5 | 5 | 4 |
| Tensile, MPa | 21.54 | 20.24 | 17.14 | 14.43 |
| Tensile, % change (from unaged specimen) | 11 | 7 | 5 | 12 |
| Elongation at break, % | 300 | 331 | 340 | 428 |
| Elongation, % change (from unaged specimen) | −7 | −4 | −14 | −13 |
| 50% Modulus, MPa | 2.27 | 2.49 | 2.26 | 2.04 |
| 100% Modulus, MPa | 4.58 | 4.44 | 4.21 | 3.58 |
| 200% Modulus, MPa | 12.85 | 10.62 | 8.60 | 5.78 |
| 300% Modulus, MPa | 21.55 | 18.51 | 14.62 | 8.99 |

TABLE 4

| Property | Ex. 1A | Ex. 1B | Ex. 1C | Ex. 1D |
|---|---|---|---|---|
| Shore A Durometer | 71 | 71 | 68 | 67 |
| Durometer, points change (from unaged specimen) | 6 | 6 | 5 | 6 |
| Durometer, points change (from aged 168 hours) | 2 | 1 | 0 | 2 |
| Tensile, MPa | 21.08 | 19.26 | 16.22 | 13.08 |
| Tensile, % change (from unaged specimen) | 8 | 2 | −1 | 2 |
| Tensile, % change (from aged 168 hours) | −2 | −5 | −5 | −9 |
| Elongation at break, % | 279 | 277 | 307 | 385 |
| Elongation, % change (from unaged specimen) | −14 | −20 | −22 | −21 |
| Elongation, % change (from aged 168 hours) | −7 | −16 | −10 | −10 |
| 50% Modulus, MPa | 2.32 | 2.48 | 2.38 | 2.14 |
| 100% Modulus, MPa | 4.81 | 4.99 | 4.57 | 3.88 |
| 200% Modulus, MPa | 13.63 | 12.53 | 9.34 | 6.25 |
| 300% Modulus, MPa | 4.60 | 4.19 | 12.62 | 9.49 |

Heat aging generally caused the rubber to show higher hardness with a corresponding increase in ultimate tensile and decrease in elongation at break. The use of Residue 1 as a partial substitute for Carbon Black 1 modified the properties responses but did not cause any particular performance to increase the resistance of the rubber compound to these expected effects of heat aging. It serves as a modifier and it could be useful in the hands of a skilled practitioner. For example if one wanted to keep the elongation at break property always in the range of 300-400% in spite of hot air heat aging up to 2 weeks at 71° C., or its equivalent, then the use of composition of Example 1C would allow one to do this, whereas all of the other example compositions would fail this particular criterion, demonstrating that Residue 1 may be used to fine-tune mechanical properties of a rubber compound.

The unaged elastomer compositions of Examples 1A-1D were also tested for Compression Set according to ASTM D395-18, Method B (button specimens aged 22 hours @ 71° C., 25% deflection, ½ hour recovery); DIN Abrasion, according to DIN 53 516/ASTM D5963-04(2019) (control abrasive, Grade: 196), and Ozone Resistance according to ASTM D1149-18, Method B, Procedure B1 (24 hours @ 40° C., 50 pphm @ 20% elongation). Results are in Table 5.

TABLE 5

| Property | Example 1A | Example 1B | Example 1C | Example 1D |
|---|---|---|---|---|
| Compression Set | 16.53% | 15.76% | 18.10% | 18.53% |
| DIN Abrasion (median) | 102 mm³ | 118 mm³ | 161 mm³ | 240 mm³ |
| Ozone Resistance[1] | Cracks | Cracks | Cracks | Cracks |

[1]Example 1B looked the best, followed by Example 1A. Examples 1C and 1D were worse than 1A, but 1C was slightly better than 1D. All cracks were visible without magnification.

These results indicate that the elastomer of Example 1B, containing Residue 1 at a substitution level of 10% versus Carbon Black 1 was superior for the Compression Set and Ozone Resistance, though in both cases the results did not appear to be dramatic.

Accelerated aging of the elastomers under simulated weather extremes of UV light and moisture was performed, the so-called QUV test. Test specimens were mounted in a relaxed state with zero strain, and the weathering machine was set according to ASTM G154-16 Cycle 1 (This corresponds with Cycle A exposure conditions in ASTM D4329-05). Irradiation conditions employed were repetitive cycles of 8 hours of UV light at temperature of 60°, followed by four hours of water condensation at 50° C., for cumulative test intervals of 800 hours and 1600 hours. An ultra-violet A 340 fluorescent lamp with irradiance value of 0.89 was employed in the test apparatus. Results are set forth in Table 6.

TABLE 6

| Property | Example 1A | Example 1B | Example 1C | Example 1D |
|---|---|---|---|---|
| Ultimate Tensile, MPa | | | | |
| No QUV Aging | 21.13 | 18.31 | 16.65 | 11.79 |
| 800 hours QUV Aging | 10.96 | 12.07 | 10.48 | 8.38 |
| 1600 hours QUV aging | 12.10 | 9.07 | 10.69 | 6.78 |
| Elongation at break | | | | |
| No QUV Aging | 350% | 342% | 397% | 471% |
| 800 hours QUV Aging | 195% | 231% | 266% | 352% |
| 1600 hours QUV aging | 207% | 168% | 257% | 291% |

As may be discerned from the Ultimate Tensile and Elongation at break, the loss in strength of the elastomer as it ages in exposure to the QUV weathering cycles was not perceptibly prevented or slowed by use of Residue 1 as partial substitute for Carbon Black 1.

Similar to the comments for the heat aged elastomers, one may be able to make specific use of this QUV accelerated aging data to target a particular and detailed property objective in making a custom formulation to meet a specific need. The use of Residue 1 as a partial replacement for Carbon Black 1 in the SBR/NR formulation did not provide a significant improvement physical or other properties. As such it may be used to reduce the dependence on the carbon black in the event that such ingredient becomes scarce, expensive or to reduce the environmental impact of the overall elastomer formulation. In addition, because Residue 1 has a lower specific gravity than carbon black, it may be used as a lower weight alternative to carbon black, thereby providing an option to reduce the weight of the elastomer product.

Example 2

Elastomer compositions were prepared using the ingredients and amounts set forth in Table 7, in which the listed amounts are in parts per hundred of rubber, and in which: EPDM refers to an ethylene propylene diene terpolymer rubber, commercially available as Vistalon™ 3702 (Exxon-Mobil); Carbon Black 2 refers to carbon black grade N650 according to ASTM D1765-19; Carbon Black 3 refers to carbon black grade N326 according to ASTM D1765-19; (78 m²/g nitrogen surface area); Clay refers to calcined kaolin clay, mean particle size (Malvern Laser) of 1.5 microns, commercially available as Polyfil® 90 from KaMin LLC; Residue 2 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed in an attrition mill to give a fine powder with a $D_{10,3}$ particle size of 4.9 microns, a $D_{50,3}$ particle size of 22.2 microns, and a $D_{90,3}$ particle size of 50.5 microns, determined by laser diffraction particle size analysis (ISO 13320: 2020). Residue 3 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed in an attrition mill followed by collecting the portion of material which passed through a U.S. Standard Sieve of 70 mesh but was retained on a U.S. Standard Sieve of 170 mesh in a gravity sieving operation at room temperature to give a coarse powder with a $D_{10,3}$ particle size of 85 microns, a $D_{50,3}$ particle size of 136 microns, and a $D_{90,3}$ particle size of 210 microns, determined by laser diffraction particle size analysis (ISO 13320:2020); Oil refers to paraffinic process oil, commercial available as Sunpar® 2280 from HollyFrontier Refining & Marketing LLC; ZnO refers to zinc oxide; TBBS refers to N-tert-butyl-2-benzothiazyl sulfonamide; and ZDBC refers to zinc dibutyldithiocarbamate.

TABLE 7

| Material | Ex. 2A | Ex. 2B | Ex. 2C | Ex. 2D | Ex. 2E | Ex. 2F |
|---|---|---|---|---|---|---|
| EPDM | 100.00 | 100.00 | 100.00 | 100.00 | 100.00 | 100.00 |
| Carbon Black 2 | 80.00 | 72.00 | 60.00 | 40.00 | 80.00 | 60.00 |
| Carbon Black 3 | 15.00 | 15.00 | 15.00 | 15.00 | 15.00 | 15.00 |
| Clay | 75.00 | 75.00 | 75.00 | 75.00 | 37.50 | 75.00 |
| Residue 2 | — | 8.00 | 20.00 | 40.00 | 37.50 | — |
| Residue 3 | — | — | — | — | — | 20.00 |
| Oil | 60.00 | 60.00 | 60.00 | 60.00 | 60.00 | 60.00 |
| ZnO | 4.00 | 4.00 | 4.00 | 4.00 | 4.00 | 4.00 |
| Stearic Acid | 2.00 | 2.00 | 2.00 | 2.00 | 2.00 | 2.00 |
| Sulfur | 1.00 | 1.00 | 1.00 | 1.00 | 1.00 | 1.00 |
| TBBS | 2.90 | 2.90 | 2.90 | 2.90 | 2.90 | 2.90 |
| ZDBC | 0.20 | 0.20 | 0.20 | 0.20 | 0.20 | 0.20 |
| Total | 340.10 | 340.10 | 340.10 | 340.10 | 340.10 | 340.10 |
| Mooney Viscosity[1] | 84.28 | 78.26 | 72.4 | 60.0 | 75.47 | 68.02 |

[1]ML 1 + 4 at 100° C. (MU).

Elastomers were prepared by one pass batch mixing in a lab scale Banbury mixer by adding all ingredients except the EPDM for pre-mixing; the EPDM was added last, and the material was heated and mixed until a drop temperature in the range of 100-104° C. was attained. The following observations were made on the mixing of the various formulations: (1) Compared to most the others, Example 2F demanded less energy to mix. However when the resulting elastomer was cut, loose particles of the Residue 3 were clearly visible. This indicates that despite the stringent mixing conditions, the Residue 3 did not adequately get incorporated into the elastomer; (2) As the level of substitution of Residue 2 against Carbon Black 2 increased in Examples 2B-2D, the elastomer appeared to become "slightly drier" and "a little more crumbly"; and (3) Example 2E behaved similarly to Example 2B, perhaps indicating that Residue 2 adhered to and interacted physically with the polymer more like calcined clay than like Carbon Black 2. Mooney Viscosities for the mixtures is reported in the last row of Table 7 and shows that use of Residue 2 or 3 as a partial replacement for Carbon Black 2 or Clay results in lower viscosities in the compounding step.

Molding and curing of standard plaques or slabs was carried out in accordance with ASTM D3182-16 using 45 minutes at 160° C. Molding and curing of compression buttons was carried out in accordance with ASTM D 395-18 using 50 minutes at 160° C. Results of various physical property tests (according to the test methods identified in Example 1) on the cured elastomers are set forth in Table 8, in which the average value of 5 specimens is reported.

TABLE 8

| Property | Ex. 2A | Ex. 2B | Ex. 2C | Ex. 2D | Ex. 2E | Ex. 2F |
|---|---|---|---|---|---|---|
| | | | Physical Properties | | | |
| 100% modulus, MPa | 2.97 | 2.74 | 2.65 | 2.04 | 3.10 | 2.28 |
| 300% modulus, MPa | 7.87 | 7.07 | 6.50 | 4.13 | 7.63 | 6.61 |
| Tensile at Break, MPa | 11.35 | 11.25 | 10.52 | 9.82 | 10.16 | 9.01 |
| Elongation at Break, % | 484 | 532 | 504 | 557 | 453 | 427 |
| Tear Strength, ASTM D 624, Die C, kN/m | 32.9 | 32.0 | 31.5 | 26.4 | 30.8 | 28.9 |
| Compression Set,, % ASTM D 395, Method B, (aged) | 53.3 | 55.1 | 49.4 | 54.3 | 51.1 | 54.7 |
| Shore A Durometer | 71 | 71 | 70 | 66 | 72 | 67 |

Dispersion of particles in the elastomers was assessed using a Nanotronics nSpec 3D; Objective employed: 10×; Topography Scan Settings: ΔZ=0.5, Model=0.4; model not flattened after scan. Results are in Table 9.

TABLE 9

| Measurement | Ex. 2A | Ex. 2B | Ex. 2C | Ex. 2D | Ex. 2E | Ex. 2F |
|---|---|---|---|---|---|---|
| Average Volume of Peaks and Valleys, m3*10^-18 | 5807 | 6328 | 5004 | 6375 | 6454 | 16408 |
| Number of Peaks and Valleys | 123 | 61 | 147 | 499 | 458 | 85 |

Dispersion of particles in the elastomers was also assessed using the Phillips Dispersion method. The samples were cut with a razor blade and pictures were taken at 30× magnification with an Olympus SZ60 Zoom Stereo Microscope interfaced with a PaxCam ARC digital camera and a Hewlett Packard LaserJet color printer. The picture of the sample was then compared to a Phillips standard dispersion rating chart having standards range from 1 (bad) to 10 (excellent). Results are set forth in Table 10.

TABLE 10

| Sample | Rating |
|---|---|
| Example 2A | 6 |
| Example 2B | 7 |
| Example 2C | 4 |
| Example 2D | 4 |
| Example 2E | 4 |

From the above physical properties results one may conclude that the use of Residue 2 as a partial substitute for Carbon Black 2 in this elastomer formulation at levels up to 10% is not expected to have a discernable effect either positive or negative on the unaged elastomer properties. At substitution levels of 25% and 50% the stress strain properties of the elastomer were diminished somewhat but may still be acceptable depending on the specific requirements of the application.

Most notable in the stress-strain mechanical results was that formulation E, which had 50% of the calcined clay in the elastomer formulation substituted for Residue 2 still maintained properties comparable to the control. This means that this use of Residue 2 may work well technically in producing elastomers with good physical properties.

Furthermore, by calculation Example 2E should have a 5.7% lower specific gravity than the control formulation owing to the 50% substitution of the heavier calcined clay (specific gravity of 2.8) by the lighter Residue 2 (specific gravity 1.28). This can be a significant advantage in the applications of elastomers which are transportation related in which energy efficiency is important, or roofing materials since the weight to be borne safely over the life of the building may dictate the structural strength requirements.

The meaning of the dispersion analysis using the nSPEC 3D method is a matter for interpretation, but the average volume of the "peaks and valleys" detected in the measurement volume is perhaps the more meaningful of the two indicators reported. A marked difference was observed between the result for the elastomers containing Residue 2 and Example 2F, which contained Residue 3 which had a much larger volume response, indicating that the rubber was less uniform and had poorer dispersion of the solids within it. If this measure is valid, then elastomers containing Residue 2 did not score worse that the control Example 2A.

Ozone Resistance was tested by ASTM D1149-18, Method B, Procedure B1. Specimens were strained to 20% elongation and exposed to ozone at 100 pphm at 40° C. Specimens were inspected for cracks using 7× magnification at intervals of 24, 48, 72 hours. Results were that all samples passed with No Cracks detected at any test interval up to 72 hours.

Examples 2A-2D were each subjected to heat aging (70 hours at 125° C. in air oven) and test for various physical properties. Results are in Table 11.

TABLE 11

| Property | Example 2A | Example 2B | Example 2C | Example 2D |
|---|---|---|---|---|
| Shore A Durometer | Unaged: 71 Aged: 75 | Unaged: 71 Aged: 75 | Unaged: 70 Aged: 74 | Unaged: 73 Aged: 76 |
| Ultimate Tensile, MPa | Unaged: 11.45 Aged: 12.00 | Unaged: 10.74 Aged: 10.76 | Unaged: 11.01 Aged: 10.16 | Unaged: 10.08 Aged: 10.63 |
| Elongation at Break, % | Unaged: 514 Aged: 336 | Unaged: 520 Aged: 323 | Unaged: 532 Aged: 331 | Unaged: 461 Aged: 277 |

Examples 2A-2E were also subjected to Xenon Arc Weatherometer Accelerated Aging according to ASTM G155-13. The testing protocol was as follows: Filter type: simulate natural sunlight (borosilicate inner and outer (water cooled)); Irradiance: 0.70 W/m$^2$ at 340 nm; Cycle: 690 min+/−15 minutes light, 30 minutes light plus water spray; Black panel temp: 80+/−3° C.; and Relative Humidity: 50+/−5%. After exposure, the specimens were removed and inspected immediately for crack and crazing under 10× magnification while wrapped around a 7.6 cm diameter mandrel. Specimens were removed and inspected after each increment of 1260 kJ/m$^2$ light exposure. Test series ended once the cumulative irradiance reached 5040 kJ/m$^2$.

No samples were found to have failed with any cracks or crazes induced by the prolonged exposure to UV radiation. In terms of appearance, some of the elastomers may have shown chalking as early as 2520 kJ/m$^2$. Use of Residue 2 as a partial replacement for Carbon Black 2 in Examples 2B-2D did not lead to failure in the accelerated weathering test. Separately calcined clay was substituted with Residue 2 at a replacement level of 50% (Example 2E) and did not lead to failure in the accelerated weathering test. Physical properties of the irradiated samples were measured. Results are in Table 12.

TABLE 12

| Property[1] | Ex. 2A | Ex. 2B | Ex. 2C | Ex. 2D | Ex. 2E |
|---|---|---|---|---|---|
| Initial Gloss[2] | 55.87 | 68.90 | 70.33 | 76.47 | 69.63 |
| Gloss at 1260 kj/m$^2$ exposure | 22.47 | 15.90 | 9.90 | 6.40 | 26.50 |
| Gloss at 2520 kj/m$^2$ exposure | 17.00 | 11.40 | 6.07 | 2.73 | 21.13 |
| Gloss at 3780 kj/m$^2$ exposure | 14.17 | 9.03 | 4.77 | 2.43 | 14.50 |
| Gloss at 5040 kj/m$^2$ exposure | 12.50 | 7.73 | 4.40 | 1.77 | 11.53 |
| Ultimate Tensile, MPa | 11.03 | 10.48 | 9.63 | 8.00 | 9.74 |
| Elongation at break, % | 282 | 280 | 283 | 316 | 895 |
| Tensile at 100% elongation, MPa | 5.01 | 5.05 | 5.04 | 4.39 | 6.17 |
| Tensile at 200% elongation, MPa | 8.80 | 8.60 | 7.98 | 6.15 | 9.15 |
| Tear Strength, kN/m | 27.1 | 26.4 | 25.7 | 23.8 | 24.9 |

[1]Reported results are for a fully weathered sample unless an exposure amount is stated.
[2]All gloss values are 60° specular gloss measured according to ASTM D523-14(2018).

Physical property tests gave results falling in line with the original unaged physical properties as a function of formula composition. Use of Residue 2 to replace calcined clay at 50% substitution (Example 2E) could result in a rubber roof membrane with a 10% weight reduction due to the specific gravity difference of 1.3 versus 2.8.

The conclusions from Example 2 were as follows: (1) Isocyanate residue particles needed to have a D90 value considerably less than 210 microns to disperse adequately into the rubber compound and a D90 value of 52 microns or lower generally resulted in adequate dispersion in the rubber compound; (2) isocyanate residue particles may be used as a partial substitute for calcined clay in the EPDM roof membrane formulation at levels as high as 50% while still providing reasonable mechanical and weathered or heat aged properties. This is a promising development, which could bode well for the potential use of such isocyanate residue particles in this application; (3) isocyanate residue particles may be used as a partial substitute for Carbon Black 2 in the EPDM roof membrane formulation at levels of 10 or 25% with only a slight loss in some unaged or weathered/aged mechanical properties.

Example 3

Elastomer compositions were prepared using the ingredients, amounts and procedure set forth in Table 13, in which the listed amounts are in parts per hundred of rubber, and in which: Nitrile Elastomer refers to a copolymer of butadiene and acrylonitrile, commercially available as ZEON Nipol® DN3350 (ZEON Corporation); Carbon Black 4 refers to carbon black grade N774 according to ASTM D1765-19; Residue 4 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed by a two-roll mill followed by a jet mill to give a medium powder with a $D_{10,3}$ particle size of 7.1 microns, a $D_{50,3}$ particle size of 42.0 microns, and a $D_{90,3}$ particle size of 159 microns, determined by laser diffraction particle size analysis (ISO 13320:2020); PEG refers to polyethylene glycol 3350 (average molecular weight 3,350 g/mol); DOS refers to dioctyl sebacate; AO refers to Akroform Antioxidant 235 (2,2'-methylene-bis-(4-methyl-6-tert-butyl-phenol); Processing Aid refers to Struktol® HPS 11, a blend of fatty acid derivatives from Struktol Co. of America; Sulfur refers to Sulfur Spider®, elemental sulfur treated with magnesium carbonate, available from The Hallstar Co.; TBBS refers to N-tert-butyl-2-benzothiazyl sulfonamide; and TMTM refers to tetramethylthiuram monosulfide.

Two part mixing of the elastomer formulation was carried on with a lab scale Banbury mixer:

TABLE 13

|  | Example 3A | Example 3B | Example 3C | Example 3D | Example 3E |
|---|---|---|---|---|---|
| First Pass |  |  |  |  |  |
| Nitrile Elastomer | 100.00 | 100.00 | 100.00 | 100.00 | 100.00 |
| Carbon Black 4 | 60.00 | 54.00 | 45.00 | 54.00 | 45.00 |
| Residue 4 | — | 6.00 | 15.00 | 6.00 | 15.00 |
| PEG | — | — | — | 1.00 | 1.00 |
| DOS | 10.00 | 10.00 | 10.00 | 10.00 | 10.00 |
| AO | 1.50 | 1.50 | 1.50 | 1.50 | 1.50 |
| Zinc Oxide | 5.00 | 5.00 | 5.00 | 5.00 | 5.00 |
| Stearic Acid | 1.00 | 1.00 | 1.00 | 1.00 | 1.00 |
| Processing Aid | 2.50 | 2.50 | 2.50 | 2.50 | 2.50 |
| Total | 180.00 | 180.00 | 180.00 | 181.00 | 181.00 |
| Final Pass |  |  |  |  |  |
| Master Batch - 1st Pass | 180.00 | 180.00 | 180.00 | 181.00 | 181.00 |
| Sulfur | 0.80 | 0.80 | 0.80 | 0.80 | 0.80 |
| TBBS | 1.00 | 1.00 | 1.00 | 1.00 | 1.00 |
| TMTM | 0.50 | 0.50 | 0.50 | 0.50 | 0.50 |
| Total | 182.30 | 182.30 | 182.30 | 183.30 | 183.30 |

| 1st Pass Master Batch |  | Final Pass |  |
|---|---|---|---|
| 0 min | Add polymer, Carbon Black 4, Residue 4 and PEG | 0 min | Sandwich in Cures |
| 82.2° C. | Add remaining ingredients | 82.2° C. | Sweep |
| 104° C. | Sweep | 98.9° C. | Dump |
| 121° C. | Sweep |  |  |
| 280° C. | Dump |  |  |

Some fillers, such as silica, are believed to manifest only weak physical bonding to the polymer when it is compounded into rubber. By analogy, in this abbreviated test round with nitrile rubber, a "coupling agent" of polyethylene glycol (PEG) was used in two of the four Examples made with Residue 4 to probe whether the presence of the PEG would allow for a beneficial surface treatment of Residue 4 or other beneficial effect. Mixing data was measured and results are in Table 14.

TABLE 14

| Example | Time (min) | Temperature (° C.) | Power (kW) | Integrated Power (MJ) |
|---|---|---|---|---|
| Master Batch Mixing |  |  |  |  |
| 3A | 5.92 | 137.2 | 8.367 | 3.847 |
| 3B | 4.32 | 136.6 | 8.546 | 2.497 |
| 3C | 4.38 | 136.7 | 8.844 | 2.398 |

TABLE 14-continued

| Example | Time (min) | Temperature (° C.) | Power (kW) | Integrated Power (MJ) |
|---|---|---|---|---|
| 3D | 4.33 | 136.3 | 8.143 | 2.410 |
| 3E | 6.20 | 134.9 | 6.987 | 2.889 |
| Final Pass Mixing |  |  |  |  |
| 3A | 1.20 | 103.3 | 9.821 | 0.8559 |
| 3B | 1.02 | 98.2 | 10.34 | 0.7418 |
| 3C | 1.03 | 97.9 | 9.702 | 0.7543 |
| 3D | 1.10 | 98.4 | 6.264 | 0.7664 |
| 3E | 1.13 | 97.8 | 9.291 | 0.7799 |

Compared to the control (Example 3A), in both the master batch mixing of the raw materials and the final pass mixing, use of some Residue 4 as a partial substitute for some Carbon Black 4 tended to reduce the overall (integrated) power demand. To judge whether this is beneficial one should also examine the corresponding quality of the rubber compounds.

Tight mill dispersion was used to judge the smooth texture of the compound and whether all of the fillers and additives were dispersed well. This method involves using a tight 2-roll mill with a close clearance to make thin films of each rubber compound. These are then inspected visually as is and in a stretched state as performed by an experienced technician. The results of this testing was the control (Example 3A) had the best result, though the 10% substitution of Carbon Black 4 by Residue 4 was nearly equivalent. At higher levels of substitution the "rough" appearance of the films increased. The use of PEG as a coupling agent neither improved nor caused a decline in the dispersion of Residue 4 in this rubber formulation.

Use of Residue 4 as partial substitute for Carbon Black 4 with or without use of PEG did not result in any significant change in the rheometer results, meaning that Mooney Viscosity was not substantially affected and indicating that use of the PEG was not meaningful.

The cured elastomer specimens were tested for physical properties (ASTM D412-16 and D2240-15, Die C dumbbells tested at 0.508 m/min; Tear Strength according to ASTM D624, Die B with specimens tested at 0.508 m/min). Results are in Table 15

TABLE 15

| Property | Example 3A | Example 3B | Example 3C | Example 3D | Example 3E |
|---|---|---|---|---|---|
| Shore A Durometer | 66 | 64 | 63 | 65 | 62 |
| Ultimate Tensile, MPa | 20.17 | 14.78 | 11.56 | 14.23 | 11.85 |
| Elongation at Break, % | 580 | 474 | 473 | 467 | 472 |
| 50% Modulus, MPa | 1.49 | 1.48 | 1.41 | 1.52 | 1.44 |
| 100% Modulus, MPa | 2.39 | 2.34 | 2.10 | 2.36 | 2.12 |
| 200% Modulus, MPa | 5.76 | 5.10 | 3.94 | 5.17 | 4.12 |
| 300% Modulus, MPa | 10.38 | 8.79 | 6.35 | 8.58 | 6.66 |
| Tear Strength, kN/m | 74.4 | 68.8 | 55.3 | 59.9 | 51.7 |

The tensile strength, modulus and tear results all suggest that the use of PEG did not improve the performance. Compared with the control (Example 3A), as the level of Residue 4 substitution increased key physical properties such as hardness, tensile strength, modulus and tear modestly declined. For some applications it is possible that the physical performance requirements may still be met satisfactorily by the use of some Residue 4, e.g. 10% substitution for carbon black, with the advantage that the waste or recycled content of the rubber compound is increased, the weight per unit volume of the rubber compound is reduced, and the environmental footprint and cost of raw materials are diminished.

Example 4

Nitrile rubber is sometimes filled with silica instead of carbon black for certain applications. To probe whether Residue 4 would add value to this type of carbon black-free rubber formulation, a set of experiments was performed.

Rubber compositions were prepared using the ingredients, amounts and procedure set forth in Table 16, in which the listed amounts are in parts per hundred of rubber, and in which: Nitrile Elastomer refers to a copolymer of butadiene and acrylonitrile, commercially available as ZEON Nipol® DN3350 (ZEON Corporation); Silica refers Silene™ 732D silicon dioxide commercially available from PPG Industries, Inc.; Residue 4 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed in a two-roll mill followed by a jet mill to give a fine powder with a $D_{10,3}$ particle size of 7.1 microns, a $D_{50,3}$ particle size of 42.0 microns, and a $D_{90,3}$ particle size of 159 microns, determined by laser diffraction particle size analysis (ISO 13320:2020); DOS refers to dioctyl sebacate; AO refers to Akroform Antioxidant 235 (2,2'-methylene-bis-(4-methyl-6-tert-butyl-phenol); Processing Aid refers to Struktol® HPS 11, a blend of fatty acid derivatives from Struktol Co. of America; Sulfur refers to Sulfur Spider®, elemental sulfur treated with magnesium carbonate, available from The Hallstar Co.; TBBS refers to N-tert-butyl-2-benzothiazyl sulfonamide; and TMTM refers to tetramethylthiuram monosulfide.

Two part mixing of the elastomer formulation was carried on with a lab scale Banbury mixer:

TABLE 16

| | Example 4A | Example 4B | Example 4C |
|---|---|---|---|
| First Pass | | | |
| Nitrile Elastomer | 100.00 | 100.00 | 100.00 |
| Silica | 60.00 | 54.00 | 45.00 |
| Residue 4 | — | 6.00 | 15.00 |
| DOS | 10.00 | 10.00 | 10.00 |
| AO | 1.50 | 1.50 | 1.50 |
| Zinc Oxide | 5.00 | 5.00 | 5.00 |
| Stearic Acid | 1.00 | 1.00 | 1.00 |
| Processing Aid | 2.50 | 2.50 | 2.50 |
| Total | 180.00 | 180.00 | 180.00 |
| Final Pass | | | |
| Master Batch - 1st Pass | 180.00 | 180.00 | 180.00 |
| Sulfur | 0.80 | 0.80 | 0.80 |
| TBBS | 1.00 | 1.00 | 1.00 |
| TMTM | 0.50 | 0.50 | 0.50 |
| Total | 182.30 | 182.30 | 182.30 |

| 1st Pass Master Batch | | Final Pass | |
|---|---|---|---|
| 0 min | Add polymer, Silica and Residue 4 | 0 min | Sandwich in Cures |
| 82.2° C. | Add remaining ingredients | 82.2° C. | Sweep |
| 104° C. | Sweep | 98.9° C. | Dump |
| 121° C. | Sweep | | |
| 138° C. | Dump | | |

Tight mill dispersion was used as a screening tool to look into whether the elastomer was good or if there were flaws in the dispersion. In this case, due to the dramatic white color of the elastomer imparted by the silica, the larger particles of Residue 4 were visible to the unaided eye and the roughness of the compound was also higher when Residue 4 was in the compound. As the level of Residue 4 increased this became more obvious. The larger particles of Residue 4 also were the foci for mechanical weakness and failure as the rubber films were subjected to extensional strain. The use of Residue 4 is, therefore, not considered likely to offer acceptable appearance in a rubber formulation filled with silica; this problem made worse by the size distribution of the Residue 4 employed in this particular trial being larger than the regular particle size Residue 4, and the finding that the particles do not break down in size during rubber compounding.

The maximum torque in the rheometer test actually increased as Residue 4 was substituted in for the silica. This is likely an artifact of the use of untreated silica in this rubber formulation. Untreated silica has a tendency to adsorb some of the curing agents on its surface rendering their effective concentration lower. The cross link density of the cured rubber is typically found to be lowered by this effect. The hypothetical explanation of these torque results is therefore that as Residue 4 was substituted in for the silica progressively, the cross link density of these rubbers likely rose compared to that of the control (Example 4A).

The cured elastomers were tested for physical properties (ASTM D412-16 and D2240-15, Die C dumbbells tested at 0.508 m/min; Tear Strength according to ASTM D624, Die B with specimens tested at 0.508 m/min). Results are in Table 17.

TABLE 17

| Property | Example 4A | Example 4B | Example 4C |
|---|---|---|---|
| Shore A Durometer | 62 | 60 | 63 |
| Ultimate Tensile, MPa | 11.65 | 8.56 | 7.57 |
| Elongation at Break, % | 778 | 766 | 764 |
| 50% Modulus, MPa | 0.94 | 1.07 | 1.13 |
| 100% Modulus, MPa | 1.25 | 1.37 | 1.45 |
| 200% Modulus, MPa | 1.86 | 1.92 | 1.94 |
| 300% Modulus, MPa | 2.45 | 2.38 | 2.32 |
| Tear Strength, kN/m | 40.1 | 32.7 | 31.5 |

As is apparent, tensile and tear strengths both decreased by the progressive rise of Residue 4 in the formulation, while elongation at break was relatively unaffected. The poor dispersion of the Residue 4 particles and the presence of the large particles that were visibly contributing defect sites in the tight mill dispersion test are considered likely to be largely responsible for this. That the various moduli were more or less constant, not visibly affected by the progressive increase in Residue 4 use is hypothesized to be due to the cross-link density increasing as the concentration of silica decreased in the respective formulation.

The larger particle size of the Residue 4 employed makes the results difficult to interpret except to conclude that this particle size distribution was too large to achieve adequate dispersion of the Residue 4 in either nitrile rubber formulation. Smaller Residue 4 particles are believed to possibly provide better results.

Example 5

Elastomer compositions were prepared using the ingredients and amounts set forth in Table 18, in which the listed amounts are in parts per hundred of rubber, and in which: EPDM refers to an ethylene propylene diene terpolymer rubber, commercially available as Royalene® 509 (Lion Elastomers); Carbon Black 5 refers to carbon black grade N550 according to ASTM D1765-19; Carbon Black 6 refers to carbon black grade N774 according to ASTM D1765-19; Residue 5 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed by a two-roll mill followed by a jet mill to give a fine powder with a $D_{10,3}$ particle size of 4 microns, a $D_{50,3}$ particle size of 18 microns, and a $D_{90,3}$ particle size of 62 microns, determined by laser diffraction particle size analysis (ISO 13320:2020); Oil refers to paraffinic process oil, commercial available as Sunpar® 2280 from HollyFrontier Refining & Marketing LLC; ZnO refers to zinc oxide; TBBS refers to N-tert-butyl-2-benzothiazyl sulfonamide; ZDBC refers to zinc dibutyldithiocarbamate; and TMTD refers to tetramethylthium disulfide.

TABLE 18

| Material | Example 5A | Example 5B | Example 5C |
|---|---|---|---|
| EPDM | 100.00 | 100.00 | 100.00 |
| Carbon Black 5 | 100.00 | 100.00 | 100.00 |
| Carbon Black 6 | 100.00 | 90.00 | 80.00 |
| Residue 5 | — | 10.00 | 20.00 |
| Oil | 120.00 | 120.00 | 120.00 |
| Calcium Oxide | 5.00 | 5.00 | 5.00 |
| ZnO | 5.00 | 5.00 | 5.00 |
| Stearic Acid | 2.00 | 2.00 | 2.00 |
| Sulfur | 1.00 | 1.00 | 1.00 |
| TBBS | 2.00 | 2.00 | 2.00 |
| ZDBC | 0.25 | 0.25 | 0.25 |
| TMTD | 0.50 | 0.50 | 0.50 |
| Total | 435.75 | 435.75 | 435.75 |

Elastomers were prepared by one pass batch mixing in a lab scale Banbury mixer by adding all ingredients except the EPDM for pre-mixing; the EPDM was added last, and the material was heated and mixed until a drop temperature in the range of 104° C. was attained. The mixing work on the lab scale Banbury showed that the progressive use of the TX-16 in the formulation resulted in lower energy requirements for mixing.

The uncured polymer was extruded through a die in a standard processing test, ASTM D2230-17. Results are in Table 19.

TABLE 19

| Example | Edge Rating | Surface Rating |
|---|---|---|
| 5A | 10 | A |
| 5B | 10 | A |
| 5C | 8 | A |

This test result shows that the use of Residue 5 at a 10% substitution level against Carbon Black 6 resulted in edge rating and surface rating equivalent to the control (Example 5A) in a Garvey die extrusion test.

Example 6

The formulations of Example 2 were prepared except that Residue 2 was replaced with Residue 4 at levels of 10% (Example 6B) and 25% (Example 6C) respectively. Example 6A was identical in composition to Example 2A. In this Example, repeated high shear processing of the elastomer composition was employed in an attempt to break down the particle size of the Residue 4 particles in-situ. Physical test results are in Table 20.

TABLE 20

| Test | Example 6A | Example 6B | Example 6C |
|---|---|---|---|
| Ultimate Tensile, MPa | 8.98 | 7.32 | 6.69 |
| 100% Modulus, MPa | 2.56 | 1.45 | 2.39 |
| 200% Modulus, MPa | 5.18 | 2.68 | 4.74 |
| 300% Modulus, MPa | 6.65 | 5.38 | 6.27 |
| Elongation at break, % | 580 | 998 | 335 |
| Hardness | 68 | 67 | 66 |

Passing the EPDM rubber containing Residue 4 at 10 or 25% substitution against the carbon black through the rubber mill ten times only marginally improved the tight mill dispersion test result as compared to only one time through the rubber mill. The control (Example 6A) had better tight mill dispersion at only one time through the rubber mill compared with the Residue 4 containing rubbers at ten times through the rubber mill. This verified the hypothesis that Residue 4 was not inclined to break down enough during processing of the uncured rubber to make it perform well enough technically as a partial substitute for carbon black, though it is also clear that the initial size of the Residue 4 particles was generally too large to be suitable for use in rubber.

Rubber formulations often contain hydrocarbon oils to improve processing in compounding and to guard the rubber against certain abrasive mechanical deterioration. It is difficult to deduce how effective isocyanate residue particles are as filler for rubber when most rubber formulations in industrial use are so complex; loaded up with multiple fillers, high levels of hydrocarbon oils and many and various additives. A simplified formulation without any oils was examined to see if isocyanate residue particles have the potential to make rubber better.

One mixing test was performed with EPDM polymer and Residue 4 particles alone, no other fillers or hydrocarbon oils whatsoever. The Residue 4 particles did not break down enough to form a smooth rubber compound with good dispersion; the rubber appeared to be rough and grainy to the unaided eye. Examination under the microscope showed distinct particles present in the matrix, which could be points for stress concentration when the material is subjected to strain.

Example 7

The purpose of this test was to examine the effect of total replacement of all conventional fillers in the compounded rubber with the Residue of isocyanate manufacturing, in effect an extreme case. The base case rubber formulation selected for this test was identical to Example 2A, the EPDM roof membrane formulation. The variants A and B replaced the two carbon blacks and the calcined clay in their entirety with 200 parts of Residue 6, but at varying levels of the Oil (paraffinic process oil, Sunpar® 2280) as indicated in Table 21. An abbreviated property check was performed on the resulting cured rubber specimens. Results are also in Table 21. Residue 6 refers to solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196 in which the solid particles were subsequently processed in a jet mill followed by collecting the portion of material which passed through a U.S. Standard Sieve of 400 mesh in a gravity sieving operation at room temperature to give a fine powder with a $D_{10,3}$ particle size of 8 microns, a $D_{50,3}$ particle size of 22 microns, and a $D_{90,3}$ particle size of 44 microns, determined by laser diffraction particle size analysis (ISO 13320:2020).

TABLE 21

| Material | Base case, composition identical to Example 2A | Example 7A | Example 7B |
|---|---|---|---|
| Filler | 170 | — | — |
| Oil | 60 | 60 | 20 |
| Residue 6 | — | 200 | 200 |
| Polymer, Oil, Filler and Residue Total | 330 | 360 | 320 |
| Ultimate Tensile, MPa | 9.30 | 2.48 | 3.54 |
| Elongation, % | 608 | 42 | 22 |
| Durometer Shore A, points | 72 | 81 | 92 |

The use of the Residue 6 in the rubber formulation caused a drastic decline in the elongation at break. Both tensile strength and elongation at break were adversely affected by Residue 6 totally replacing all filler, including calcined clay and carbon black, in the formulation. Even though the values for the Durometer Shore A (hardness) were higher when Residue 6 was used, that change is not believed to be enough to explain this drastic change in tensile and elongation of the rubber.

For the rubber formulas given above the substitution of all the calcined clay and carbon black by Residue 6 are expected to result in rubber compounds with these specific gravities: Example 2A—1.237; Example 7A—1.081; Example 7B—1.108.

Example 8

Stabaxol® I, an active antihydrolysis agent for polyester polyurethanes (from Lanxess) and/or Residue 7 was mixed into a thermoplastic polyurethane ("TPU"), Texin® 285A (commercially available from Covestro LLC), a polyester-based aromatic TPU with nominal 85 Shore A hardness, using a laboratory scale single screw extruder. The material was extruded into strands using a die and granulated. Granules were hand cast to prepare specimens for physical testing. Residue 7 was solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196. The solid particles were processed in an attrition mill to give a very fine powder with particle sizes as follows: D10 of 3.8, D50 of 10.0, D90 of 19.1, all in units of microns, as determined by laser diffraction particle size analysis (ISO 13320:2020). The TPU properties as a function of loading with Residue 7 are as stated in Table 22.

TABLE 22

| Test Details | Ex. 8A | Ex. 8B | Ex. 8C | Ex. 8D | Ex. 8E | Ex. 8F |
|---|---|---|---|---|---|---|
| Stabaxol ® I | — | 0.26% | — | 0.13% | — | — |
| Residue — | — | — | 0.26% | 0.13% | 1.18% | 10% |
| Shore A Durometer @ 1 sec | 87 | 87 | 87 | 87 | 87 | 90 |
| Shore A Durometer @ 5 sec | 86 | 86 | 86 | 86 | 86 | 89 |
| Tensile @ 100% elongation, MPa | 5.27 | 5.41 | 5.52 | 5.40 | 5.40 | 6.98 |
| Tensile @ 200% elongation, MPa | 6.70 | 6.99 | 7.15 | 7.08 | 7.31 | 10.80 |
| Tensile @ 300% elongation, MPa | 9.38 | 10.4 | 10.4 | 10.6 | 11.3 | 14.2 |
| Ultimate tensile strength, MPa | 31.3 | 37.9 | 39.5 | 36.7 | 36.9 | 18.6 |

TABLE 22-continued

| Test Details | Ex. 8A | Ex. 8B | Ex. 8C | Ex. 8D | Ex. 8E | Ex. 8F |
|---|---|---|---|---|---|---|
| Ultimate Elongation, % | 742 | 538 | 558 | 548 | 559 | 679 |
| Die "C" Tear Strength, kN/m | 89.0 | 89.3 | 90.7 | 90.2 | 90.7 | 101.0 |

Example 8D shows the effect of both Stabaxol I and Residue 7 present in the same TPU compound; mass loadings of Example 4D add up to the same value as runs Examples 8B and 8C, so these three may be compared against each other. Comparing the mechanical properties they are essentially identical, if anything the use of Residue 7 brought a modest advantage in strength properties.

Use of 10% of Residue 7 (Example 8F) caused a modest increase in hardness, and better tear resistance and tensile modulus at 100, 200 and 300% elongation. Ultimate tensile strength and elongation at break both indicate that the specimen became weaker with the use of the Residue 7, though not dramatically. There appeared to be some tradeoffs in the properties. TPU elastomer compositions containing up to 30% of Residue 7 were also prepared.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An elastomer composition comprising:
   (a) at least 20% by weight, based on the total weight of the elastomer composition, of a polymer matrix comprising a diene-containing rubber; and
   (b) 0.1 to 70% by weight, based on the total weight of the elastomer composition, of a solid isocyanate residue having, prior to its inclusion in the elastomer composition, a $D_{90,3}$ particle size of no more than 70 microns.

2. The elastomer composition of claim 1, wherein the polymer matrix further comprises a natural rubber and the diene-containing rubber and natural rubber are present in relative amounts of at least 1 part diene-containing rubber to 1 part natural rubber.

3. The elastomer composition of claim 1, wherein the polymer matrix is present in the elastomer composition in an amount of 20 to 90% by weight, based on the total weight of the elastomer composition.

4. The elastomer composition of claim 1, wherein the solid isocyanate residue has a content of bound isocyanate that is less than 10% by weight, based on the total weight of the solid isocyanate residue.

5. The elastomer composition of claim 1, wherein the solid isocyanate residue comprises a residue from the synthesis of a toluene diisocyanate.

6. The elastomer composition of claim 1, wherein the solid isocyanate residue, prior to inclusion in the elastomer composition, has a $D_{50,3}$ particle size of no more than 25 microns.

7. The elastomer composition of claim 1, wherein the solid isocyanate residue has a specific gravity of 1.2 to 1.4.

8. The elastomer composition of claim 1, wherein the solid isocyanate residue is present in the elastomer composition in an amount of 1 to 20% by weight, based on the total weight of the elastomer composition.

9. The elastomer composition of claim 1, wherein the elastomer composition further comprises carbon black and the solid isocyanate residue and carbon black are present in the elastomer composition at a relative ratio, by weight, of 1:1 to 10:1.

10. The elastomer composition of claim 1, wherein the polymer matrix further comprises a thermoplastic polyurethane.

11. An elastomer composition comprising:
    (a) at least 20% by weight, based on the total weight of the elastomer composition, of a polymer matrix comprising a diene-containing rubber; and
    (b) 0.1 to 70% by weight, based on the total weight of the elastomer composition, of organic particulates having, prior to its inclusion in the elastomer composition, a $D_{90,3}$ particle size of no more than 70 microns, the organic particulates comprising:
       (i) a crosslinked polymer comprising aromatic groups, biuret groups, urea groups, and carbodiimide groups; and
       (ii) a high-boiling hydrocarbon.

12. The elastomer composition of claim 11, wherein the polymer matrix further comprises a thermoplastic polyurethane.

13. The elastomer composition of claim 11, wherein the organic particulates have a content of bound isocyanate that is less than 10% by weight, based on the total weight of the organic particulates.

14. The elastomer composition of claim 11, wherein the content of high-boiling hydrocarbon in the organic particulates is 1 to 10% by weight, based on the total weight of the solid organic particulate.

15. The elastomer composition of claim 11, wherein the organic particulates have, prior to inclusion in the elastomer composition, a $D_{50,3}$ particle size of no more than 25 microns.

16. The elastomer composition of claim 11, wherein the organic particulates have a specific gravity of 1.2 to 1.4.

17. The elastomer composition of claim 11, wherein the organic particulates are present in the elastomer composition in an amount of 1 to 20% by weight, based on the total weight of the elastomer composition.

18. The elastomer composition of claim 11, wherein the elastomer composition further comprises carbon black and the organic particulates and carbon black are present in the elastomer composition at a relative ratio, by weight, of 1:1 to 10:1.

* * * * *